(12) United States Patent
Takahashi

(10) Patent No.: US 7,069,425 B1
(45) Date of Patent: Jun. 27, 2006

(54) REAL-TIME PROCESSOR EXECUTING PREDETERMINED OPERATION DEFINED BY PROGRAM CORRECTLY AT PREDETERMINED TIME

(75) Inventor: Masafumi Takahashi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/573,258

(22) Filed: May 18, 2000

(30) Foreign Application Priority Data

May 18, 1999 (JP) ................... 11-137638

(51) Int. Cl.
G06F 9/00 (2006.01)
(52) U.S. Cl. ...................................... 712/218
(58) Field of Classification Search ................ 712/200, 712/215, 233, 234, 218; 713/600, 400; 365/233
See application file for complete search history.

(56) References Cited

U.S. PATENT DOCUMENTS

| | | | | |
|---|---|---|---|---|
| 4,040,021 A | * | 8/1977 | Birchall et al. ............. | 713/601 |
| 4,101,761 A | * | 7/1978 | Merryman ................... | 377/39 |
| 4,497,023 A | * | 1/1985 | Moorer ....................... | 712/205 |
| 4,847,755 A | * | 7/1989 | Morrison et al. ........... | 712/203 |
| 4,887,279 A | * | 12/1989 | Odenheimer ................ | 375/226 |
| 5,546,037 A | * | 8/1996 | Kenny et al. ............... | 327/230 |
| 5,619,679 A | * | 4/1997 | Ibi .............................. | 711/167 |
| 5,765,037 A | * | 6/1998 | Morrison et al. ........... | 713/502 |
| 5,887,127 A | * | 3/1999 | Saito et al. .................... | 714/4 |
| 5,958,044 A | * | 9/1999 | Brown et al. ............... | 712/219 |
| 5,966,544 A | * | 10/1999 | Sager .......................... | 712/32 |
| 5,982,828 A | * | 11/1999 | Fujimori et al. ............ | 375/356 |
| 5,982,842 A | * | 11/1999 | Ohtsuka et al. ............. | 377/20 |
| 6,000,029 A | * | 12/1999 | Moyer et al. ............... | 712/244 |
| 6,115,083 A | * | 9/2000 | Doherty et al. ............. | 348/771 |
| 6,230,263 B1 | * | 5/2001 | Ryan et al. ................. | 712/245 |
| 6,370,638 B1 | * | 4/2002 | Yamasaki ................... | 712/219 |

FOREIGN PATENT DOCUMENTS

JP          A-5233277          9/1993

OTHER PUBLICATIONS

Intel. Pentium® Processor Family Developer's Manual vol. 3: Architecture and Programming Manual. Mt. Prospect, IL: Intel Corporation © 1995. p. 3-13.*

(Continued)

*Primary Examiner*—Eddie Chan
*Assistant Examiner*—Aimee J. Li
(74) *Attorney, Agent, or Firm*—Birch, Stewart, Kolasch & Birch, LLP

(57) ABSTRACT

A real-time processor includes a clock register updating a time at a predetermined interval, a time register storing an arbitrary time, a time comparator comparing the time in the clock register with the time stored in the time register, and an instruction processing unit executing an instruction whose execution status is altered according to the comparison result of the time comparator. A predetermined operation can be carried out correctly at a predetermined time since the instruction processing unit executes an instruction whose execution status is altered according to the comparison result of the time comparator.

20 Claims, 40 Drawing Sheets

OTHER PUBLICATIONS

Tanenbaum, Andrew S. "Structured Computer Organization". Second Edition. Englewood Cliffs, NJ: Prentice-Hall, Inc., © 1984. pp. 10-12.*

Heuring, Vincent P. and Jordan, Harry F. "Computer Systems Design and Architecture". Reading, Mass.: Addison Wedley Longman, Inc., © 1997. pp. 534-536.*

* cited by examiner

| MNEMONIC | OPERATION |
|---|---|
| MOV ETR, #0 | SET 1 IN CLOCK REGISTER |
| SUB ETR, ETR, op | SUBTRACT op FROM CLOCK REGISTER |
| MOV EUR, op | SET op IN TIME REGISTER |
| BTLOU adr | BRANCH TO adr IF (CLOCK REGISTER < TIME REGISTER) |
| BTEQU adr | BRANCH TO adr IF (CLOCK REGISTER = TIME REGISTER) |
| BTHIU adr | BRANCH TO adr IF (CLOCK REGISTER $\geq$ TIME REGISTER) |
| WAIT | DELAY INSTRUCTION EXECUTION COMPLETION UNTIL (CLOCK REGISTER $\geq$ TIME REGISTER) IS ESTABLISHED |
| WLDR Rd, [adr] | LOAD VALUE FROM MEMORY ADDRESS adr INTO REGISTER Rd WHEN (CLOCK REGISTER $\geq$ TIME REGISTER) IS ESTABLISHED |
| WSTR Rs, [adr] | STORE VALUE OF REGISTER Rs INTO MEMORY ADDRESS adr WHEN (CLOCK REGISTER $\geq$ TIME REGISTER) IS ESTABLISHED |
| WINR Rd, [adr] | LOAD VALUE FROM I/O ADDRESS adr INTO REGISTER Rd WHEN (CLOCK REGISTER $\geq$ TIME REGISTER) IS ESTABLISHED |
| WOUTR Rs, [adr] | STORE VALUE OF REGISTER Rs INTO I/O ADDRESS adr WHEN (CLOCK REGISTER $\geq$ TIME REGISTER) IS ESTABLISHED |
| WPREFIX | QUALIFY BEHAVIOR OF SUCCEEDING INSTRUCTION FOR DELAYING ITS EXECUTION COMPLETION UNTIL (CLOCK REGISTER $\geq$ TIME REGISTER) IS ESTABLISHED |

FIG. 10

| LINE NUMBER | LABEL | OPERATION/OPERAND | COMMENT |
|---|---|---|---|
| 1 | | ADR R0, port | ; port: OUTPUT PORT ADDRESS |
| 2 | | MOV R1, #on | ; on: VALUE TO TURN ON PORT |
| 3 | | MOV R2, #off | ; off: VALUE TO TURN OFF PORT |
| 4* | | MOV ETR, #0 | ; INITIALIZE CLOCK REGISTER (t1) |
| 5* | | MOV EUR, #6 | ; SET TIME REGISTER (t2) |
| 6* | | WAIT | ; STALL EXECUTION UNTIL t3 |
| 7 | | STR R1, [R0] | ; TURN ON PORT |
| 8* | | MOV EUR, #13 | ; UPDATE TIME REGISTER (t4) |
| 9* | | WAIT | ; STALL EXECUTION UNTIL t5 |
| 10 | | STR R2, [R0] | ; TURN OFF PORT |

FIG. 12

| LINE NUMBER | LABEL | OPERATION/OPERAND | | COMMENT |
|---|---|---|---|---|
| 1 | | ADR | R0, PORT | |
| 2 | | MOV | R1, #ON | |
| 3 | | MOV | R2, #OFF | |
| 4 | | MOV | R3, #4 | ; SPECIFY OUTPUT TIME OF FIRST PULSE |
| 5* | | MOV | ETR, 0 | |
| 6* | | MOV | EUR, R3 | |
| 7* | L1 | WAIT | | ; STALL EXECUTION UNTIL SPECIFIED TIME(t11, t15) |
| 8 | | STR | R1, [R0] | ; OUTPUT PULSE TO PORT |
| 9 | | STR | R2, [R0] | |
| 10 | | ADD | R3, R3, #11 | ; CALCULATE OUTPUT TIME OF NEXT PULSE |
| 11* | | MOV | EUR, R3 | ; UPDATE TIME REGISTER (t12) |
| 12 | | CMP | R3, #128 | ; CORRECTION OF CLOCK/TIME REGISTER REQUIRED? |
| 13 | | BLO | L1 | ; CORRECTION NOT REQUIRED IF VALUE SMALL ENOUGH |
| 14 | | SUB | R4, R3, #11 | ; OBTAIN CORRECTION VALUE |
| 15* | | SUB | ETR, ETR, R4 | ; SUBTRACT CORRECTION VALUE FROM CLOCK REGISTER (t13) |
| 16 | | SUB | R3, R3, R4 | ; SUBTRACT CORRECTION VALUE FROM OUTPUT TIME OF NEXT PULSE |
| 17* | | MOV | EUR, R3 | ; SET CORRECTED TIME IN TIME REGISTER (t14) |
| 18 | | B | L1 | |

FIG. 14

| LINE NUMBER | LABEL | OPERATION | OPERAND | COMMENT |
|---|---|---|---|---|
| 1 | | ADR | R0, PORT | |
| 2 | | MOV | R1, #ON | ; SPECIFY TIME TO TURN ON PORT |
| 3 | | MOV | R2, #1000 | |
| 4* | | MOV | ETR, 0 | ; OBTAIN PREPARATION START TIME |
| 5 | | SUB | R3, R2, #100 | |
| 6* | | MOV | EUR, R3 | ; SET PREPARATION START TIME IN TIME REGISTER |
| 7* | L1 | BTHIU | L2 | ; BRANCH TO L2 IF PASSED PREPARATION START TIME |
| 8 | | BL | BACKGROUND | ; BACKGROUND PROCESSING |
| 9 | | B | L1 | |
| 10* | L2 | MOV | EUR, R2 | ; SET TIME TO TURN ON PORT IN TIME REGISTER |
| 11* | | WAIT | | ; STALL EXECUTION UNTIL TIME TO TURN ON PORT |
| 12 | | STR | R1, [R0] | ; TURN PORT ON |

FIG. 16

EXECUTION TIME REG: EXECUTION TIME REGISTER, TF REG: TF REGISTER,
SEL: SELECTOR, SUB: SUBTRACTER

| MNEMONIC | OPERATION |
|---|---|
| WMOV EER, ETR | DELAY INSTRUCTION EXECUTION COMPLETION UNTIL (CLOCK REGISTER ≧ TIME REGISTER) IS ESTABLISHED. COPY VALUE OF CLOCK REGISTER INTO EXECUTION TIME REGISTER WHEN INSTRUCTION EXECUTION IS COMPLETED. |
| CMP EER, op | SUBTRACT op FROM EXECUTION TIME REGISTER, AND ALTER FLAG OF PROGRAM STATUS REGISTER. DISCARD RESULT. |
| WAIT2 | DELAY INSTRUCTION EXECUTION COMPLETION UNTIL (CLOCK REGISTER ≧ TIME REGISTER) IS ESTABLISHED. WHEN INSTRUCTION EXECUTION IS COMPLETED, CLEAR T FLAG IF (CLOCK REGISTER = TIME REGISTER), AND SET T FLAG IF (CLOCK REGISTER > TIME REGISTER). |
| WAIT3 | DELAY INSTRUCTION EXECUTION COMPLETION UNTIL (CLOCK REGISTER ≧ TIME REGISTER) IS ESTABLISHED. WHEN INSTRUCTION EXECUTION IS COMPLETED, KEEP T FLAG IF (CLOCK REGISTER = TIME REGISTER), AND SET T FLAG IF (CLOCK REGISTER > TIME REGISTER). |
| BTC adr | BRANCH TO adr IF T FLAG IS CLEARED |
| BTS adr | BRANCH TO adr IF T FLAG IS SET |
| CLRT | CLEAR T FLAG |
| SETT | SET T FLAG |

FIG. 18

| LINE NUMBER | LABEL | OPERATION/OPERAND | | COMMENT |
|---|---|---|---|---|
| 1* | | MOV | EUR, #2 | ; SET 2 IN TIME REGISTER |
| 2* | | WMOV | EER, ETR | ; FOLLOWING EXECUTION STALLED UNTIL SPECIFIED TIME, |
| | | | | ; SET EXECUTION TIME REGISTER |
| 3* | | MOV | EUR, #7 | ; SET 7 IN TIME REGISTER |
| 4 | | BL | SUBROUTINE | ; CALL UP SUBROUTINE WHOSE EXECUTION TIME IS INDEFINITE |
| 5* | | WMOV | EER, ETR | ; FOLLOWING EXECUTION STALLED UNTIL SPECIFIED TIME, |
| | | | | ; SET EXECUTION TIME REGISTER |
| 6* | | CMP | EER, #7 | ; CHECK SCHEDULING VIOLATION |
| 7 | | BLHI | RECOVER | ; RECOVERY PROCEDURE OF VIOLATION |
| 8* | | MOV | EUR, #13 | ; SET 13 IN TIME REGISTER |
| 9* | | WMOV | EER, ETR | ; FOLLOWING EXECUTION STALLED UNTIL SPECIFIED TIME, |
| | | | | ; SET EXECUTION TIME REGISTER |
| 10* | | CMP | EER, #13 | ; CHECK SCHEDULING VIOLATION |
| 11 | | BLHI | RECOVER | ; RECOVERY PROCEDURE OF VIOLATION |

FIG. 19

| LINE NUMBER | LABEL | OPERATION/OPERAND | | COMMENT |
|---|---|---|---|---|
| 1* | | MOV | EUR, #2 | ; SET 2 IN TIME REGISTER |
| 2* | | WAIT2 | | ; FOLLOWING EXECUTION STALLED UNTIL SPECIFIED TIME, UPDATE T FLAG |
| 3* | | MOV | EUR, #7 | ; SET 7 IN TIME REGISTER |
| 4 | | BL | SUBROUTINE | ; CALL UP SUBROUTINE WHOSE EXECUTION TIME IS INDEFINITE |
| 5* | | WAIT2 | | ; FOLLOWING EXECUTION STALLED UNTIL SPECIFIED TIME, UPDATE T FLAG |
| 6* | | BTC | OK1 | ; CHECK SCHEDULING VIOLATION |
| 7 | | BL | RECOVER | ; RECOVERY PROCEDURE OF VIOLATION |
| 8* | OK1 | MOV | EUR, #13 | ; SET 13 IN TIME REGISTER |
| 9* | | WAIT2 | | ; FOLLOWING EXECUTION STALLED UNTIL SPECIFIED TIME, UPDATE T FLAG |
| 10* | | BTC | OK2 | ; CHECK SCHEDULING VIOLATION |
| 11 | | BL | RECOVER | ; RECOVERY PROCEDURE OF VIOLATION |
| 12 | OK2 | | | |

FIG. 21

| LINE NUMBER | LABEL | OPERATION/OPERAND | | COMMENT |
|---|---|---|---|---|
| 1* | | MOV | EUR, #2 | ; SET 2 IN TIME REGISTER |
| 2* | | WAIT2 | | ; FOLLOWING EXECUTION STALLED UNTIL SPECIFIED TIME, |
| | | | | ; UPDATE T FLAG |
| 3* | | MOV | EUR, #7 | ; SET 7 IN TIME REGISTER |
| 4 | | BL | SUBROUTINE | ; CALL UP SUBROUTINE WHOSE EXECUTION TIME IS INDEFINITE |
| 5* | | WAIT3 | | ; FOLLOWING EXECUTION STALLED UNTIL SPECIFIED TIME, |
| | | | | ; UPDATE T FLAG |
| 6* | | MOV | EUR, #13 | ; SET 13 IN TIME REGISTER |
| 7* | | WAIT3 | | ; FOLLOWING EXECUTION STALLED UNTIL SPECIFIED TIME, |
| | | | | ; UPDATE T FLAG |
| 8* | | BTC | OK | ; CHECK SCHEDULING VIOLATION |
| 9 | | BL | RECOVER | ; RECOVERY PROCEDURE OF VIOLATION |
| 10 | OK | | | |

FIG. 23

| MNEMONIC | OPERATION |
|---|---|
| NORM1 | SUBTRACT VALUE OF TIME REGISTER FROM CLOCK REGISTER AND SET 0 IN TIME REGISTER AT SAME TIME |
| NORM2 | SUBTRACT VALUE OF CLOCK REGISTER FROM TIME REGISTER AND SET 1 IN CLOCK REGISTER AT SAME TIME |
| NORM3 | IF (CLOCK REGISTER > TIME REGISTER), SUBTRACT VALUE OF TIME REGISTER FROM CLOCK REGISTER AND SET 0 IN TIME REGISTER AT SAME TIME. IF (CLOCK REGISTER < TIME REGISTER), SUBTRACT VALUE OF CLOCK REGISTER FROM TIME REGISTER AND SET 1 IN CLOCK REGISTER AT SAME TIME. IF (CLOCK REGISTER = TIME REGISTER), SET 0 IN TIME REGISTER AND 1 IN CLOCK REGISTER. |

FIG. 26

| LINE NUMBER | LABEL | OPERATION/OPERAND | | COMMENT |
|---|---|---|---|---|
| 1* | NORM2 | | | ; SECOND TIME CORRECTION INSTRUCTION |
| 2 | | BL | SUBROUTINE | ; CALL UP SUBROUTINE WHOSE EXECUTION TIME IS INDEFINITE |
| 3* | NORM1 | | | ; FIRST TIME CORRECTION INSTRUCTION |
| 4* | | MOV | EUR, #6 | ; SET 6 IN TIME REGISTER |
| 5 | | BL | SUBROUTINE | ; CALL UP SUBROUTINE WHOSE EXECUTION TIME IS INDEFINITE |
| 6* | NORM3 | | | ; THIRD TIME CORRECTION INSTRUCTION |

FIG. 27

| MNEMONIC | OPERATION |
|---|---|
| MOV Rd, ETR | COPY VALUE OF CLOCK REGISTER INTO REGISTER Rd |
| MOV ETR, Rs | COPY VALUE OF REGISTER Rs INTO CLOCK REGISTER |
| MOV Rd, EUR | COPY VALUE OF TIME REGISTER INTO REGISTER Rd |
| SUB Rd, ETR, EUR | SET RESULT OF SUBTRACTING VALUE OF TIME REGISTER FROM VALUE OF CLOCK REGISTER IN Rd |
| ADD EUR, EUR, op | ADD op TO TIME REGISTER |
| LDR EUR, [adr] | LOAD VALUE OF MEMORY ADDRESS adr INTO TIME REGISTER |
| STR EUR, [adr] | STORE VALUE OF TIME REGISTER INTO MEMORY ADDRESS adr |

FIG. 30

| INPUT VALUE | | OUTPUT VALUE |
| --- | --- | --- |
| C0 | C1 | N |
| L | L | INPUT VALUE TO CN |
| L | H | 1 |
| H | H | 1 |
| H | L | 0 |

FIG. 34

| INPUT VALUE S | OUTPUT VALUE X |
|---|---|
| 0 | INPUT VALUE TO A |
| 1 | INPUT VALUE TO C |
| 2 | INPUT VALUE TO D |
| 3 | INPUT VALUE TO B |

FIG. 35

| MNEMONIC | OPERATION |
|---|---|
| MOV Rd, INR | COPY VALUE OF INPUT BUFFER INTO REGISTER Rd |
| MOV Rd, OUTR | COPY VALUE OF OUTPUT REGISTER INTO REGISTER Rd |
| MOV OUT, Rs | COPY VALUE OF REGISTER Rs INTO OUTPUT REGISTER |

FIG. 40

REAL-TIME PROCESSOR EXECUTING PREDETERMINED OPERATION DEFINED BY PROGRAM CORRECTLY AT PREDETERMINED TIME

BACKGROUND OF THE INVENTION

1. Field of the Invention

The present invention relates to a microprocessor that operates according to a program. Particularly, the present invention relates to a real-time processor that executes a predetermined operation defined by a program correctly at a predetermined time.

2. Description of the Background Art

In accordance with the development of microprocessor techniques, microprocessors are now beginning to be used also for the control of hardware which have been conventionally carried out by an application specific circuit. It is important to adjust the operation timing so that the microprocessor outputs an appropriate control signal at an appropriate time in order to control the hardware properly. This operation timing must not be earlier nor delayed than the predetermined time.

For the adjustment of the operation timing by the microprocessor, the method of inserting a NOP (No Operation) instruction or empty loop in the program to delay execution of the program for a required period of time has been generally employed. However, the period of time required for the microprocessor to execute the program varies in a complex manner depending upon various factors such as the value of the processed data, the memory operation time (access delay), the frequency of the clock signal, and the like. When the program becomes extremely complicated, it will become difficult to calculate the appropriate delay time during creation of the program.

In order to realize a system of high reliability, it is desirable to include the mechanism to detect occurrence of an abnormal event, if any, that negates execution of a predetermined operation at a predetermined time, and carry out a recovery procedure.

One conventional art directed to solve such a problem is known as the microprocessor disclosed in Japanese Patent Laying-Open No. 5-233277. FIG. 1 is a block diagram showing a structure of the microprocessor disclosed in this publication. A microprocessor 901 includes a processing unit 902 that executes an instruction code, a time adjustment unit 903 adjusting the time between instruction codes, and a buffer 908 connected to an external bus. Time adjustment unit 903 includes a time measurement unit 904 measuring the time between two instruction codes, a certain time set unit 905 setting a certain time, a difference arithmetic unit 906 computing the difference between the time set by certain time set unit 905 and the time measured by time measurement unit 904, and an idle state insertion unit 907 inserting an idle state for a period of time corresponding to the difference obtained by difference arithmetic unit 906.

Upon execution of the first instruction (instruction indicating initiation of measurement) by processing unit 902, the value of time measurement unit 904 is initialized to 0, and the value thereof is incremented at a constant time period. Here, it is assumed that the time when the first instruction is executed is t901.

Processing unit 902 then executes the second instruction (instruction indicating end of measurement). Here, it is assumed that the time when the second instruction is executed is t902. Difference arithmetic unit 906 calculates the difference between the value set by certain time set unit 905 and the time measured by time measurement unit 904 (=t902−t901), and provides that value to idle state insertion unit 907. Idle state insertion unit 907 suppresses the operation of processing unit 902 until the elapse of the time corresponding to the difference calculated by difference arithmetic unit 906. Here, it is assumed that the time when processing unit 906 resumes its operation is t903.

By the operation described above, the difference calculated by difference arithmetic unit 906 becomes smaller if the time of elapse from t901 to t902 becomes longer, whereby the suppression time of processing unit 902 becomes shorter. In contrast, a shorter elapse time from t901 to t902 results in a larger difference calculated by difference arithmetic unit 906, whereby the suppression time of processing unit 902 becomes longer. Thus, the suppression time of processing unit 902 varies so as to compensate for change in the elapse time from t901 to t902. The elapse time from t901 to t903 is determined depending only on the value set at certain time set unit 905. The elapse time from t901 to t903 is kept constant irrespective of the execution speed of processing unit 902 that is altered according to various factors.

However, only adjustment of the elapse time between two instructions is taken into consideration in the microprocessor disclosed in Japanese Patent Laying-Open No. 5-233277. As to the method of altering the value of time measurement unit 904 according to an instruction in the program, only the method of initializing the value of time measurement unit 904 to 0 in response to execution of an instruction to initiate measurement by processing unit 902 is disclosed. The microprocessor thereof cannot adjust the elapse time between arbitrary instructions in association with execution of the instruction that designates initiation of measurement.

Also, the time that can be measured by time measurement unit 904 is finite. In order to prevent overflow of time measurement unit 904, processing unit 902 must execute the instruction designating initiation of measurement at least once within a limited period of time. This microprocessor is not suited for applications in which a certain instruction is repeatedly executed infinitely at a constant time interval.

Furthermore, the case where the difference calculated by difference arithmetic unit 906 attains a negative value, i.e., when the elapse time from t901 to t902 becomes unexpectedly long to exceed t903, is not taken into consideration. There was problem that this microprocessor could not carry out the recovery procedure in the case where the difference calculated by difference arithmetic unit 906 provides a negative value.

SUMMARY OF THE INVENTION

An object of the present invention is to provide a real-time processor that can carry out a predetermined operation at a predetermined time impervious to various factors.

Another object of the present invention is to provide a real-time processor that can carry out processing without overflow of the timer that measures the time.

A further object of the present invention is to provide a real-time processor that can detect failure, if any, of execution of a predetermined operation at a predetermined time, and carry out a recovery procedure.

Still another object of the present invention is to provide an instruction execution method to carry out a predetermined operation at a predetermined time impervious to various factors.

A still further object of the present invention is to provide an instruction execution method that can carry out processing without overflow of the timer that measures the time.

According to an aspect of the present invention, a real-time processor includes a clock register updating the time at a predetermined interval, a time register storing an arbitrary time, a time comparator comparing the time of the clock register and the time stored in the time register, and an instruction processing unit executing an instruction that has the execution status altered depending upon the comparison result of the time comparator.

Since the instruction processing unit executes an instruction that has the execution status altered according to the comparison result of the time comparator, a predetermined operation can be carried out correctly at a predetermined time.

Preferably, the real-time processor includes a subtracter subtracting a predetermined value from the time of the clock register and setting the subtracted value in the clock register. The instruction processing unit subtracts a predetermined value from the time stored in the time register, and sets the subtracted value in the time register.

The clock register can be prevented from overflowing by virtue of the subtracter setting an appropriate subtracted value in the clock register and the instruction processing unit setting an appropriate subtracted value in the time register.

Further preferably, the time comparator detects the match of the time in the clock register with the time stored in the time register, and also detects that the time in the clock register is greater than the time stored in the time register.

Since the time comparator detects that the time in the clock register matches the time stored in the time resister, and that the time in the clock register is greater than the time stored in the time register, establishment of scheduling and scheduling violation can be identified to allow execution of an instruction according to that status.

According to another aspect of the present invention, an instruction execution method of a processor includes the steps of updating the time at a predetermined interval, storing an arbitrary time, comparing the updated time with the stored arbitrary time, and executing an instruction whose execution status is altered depending upon the comparison result.

A predetermined operation can be carried out correctly at a predetermined time since an instruction whose execution status changes according to the comparison result is carried out.

Preferably, the instruction execution method further includes the steps of subtracting a predetermined value from an updated time, and subtracting a predetermined value from a stored arbitrary time.

Occurrence of overflow is prevented since a predetermined value is subtracted from an updated time and a predetermined value is subtracted from a stored arbitrary time.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 shows a list of additional instructions added to an instruction processing unit 10 of the first embodiment.

FIG. 12 shows an example of a program using the additional instructions of FIG. 10.

FIG. 14 shows another example of a program using the additional instructions of FIG. 10.

FIG. 16 shows an example of a program using a BTHIU instruction.

FIG. 18 shows a list of additional instructions added to an instruction processing unit 10a of the second embodiment.

FIG. 19 shows an example of a program using the additional instructions of FIG. 18.

FIG. 21 shows another example of a program using the additional instructions of FIG. 18.

FIG. 23 shows a further example of a program using the additional instructions of FIG. 18.

FIG. 26 shows a list of additional instructions added to an instruction processing unit 10b of the third embodiment.

FIG. 27 shows an example of a program using the additional instructions of FIG. 26.

FIG. 30 shows a list of additional instructions added to an instruction processing unit 10c of the fourth embodiment.

FIG. 34 is a diagram to describe an operation of a combination circuit 90.

FIG. 35 is a diagram to describe an operation of a combination circuit 93.

FIG. 40 shows a list of additional instructions added to an instruction processing unit 10e of the sixth embodiment.

DESCRIPTION OF THE PREFERRED EMBODIMENTS

The timer operation of a real-time processor of the present invention will first be described.

In the following, an ideal clock register that is not limited in the size of the stored values is envisaged, and the value thereof is represented as "ideal clock register value". Also the value of a practical clock register taking into consideration mounting limitation is represented as "practical clock register value". For the sake of simplification, the ideal clock register value is assumed to be 0 when the system is actuated. Similarly, the value of an ideal time register is represented as "ideal time register value", and the value of a practical time register is represented as "practical time register value".

Figure 1:
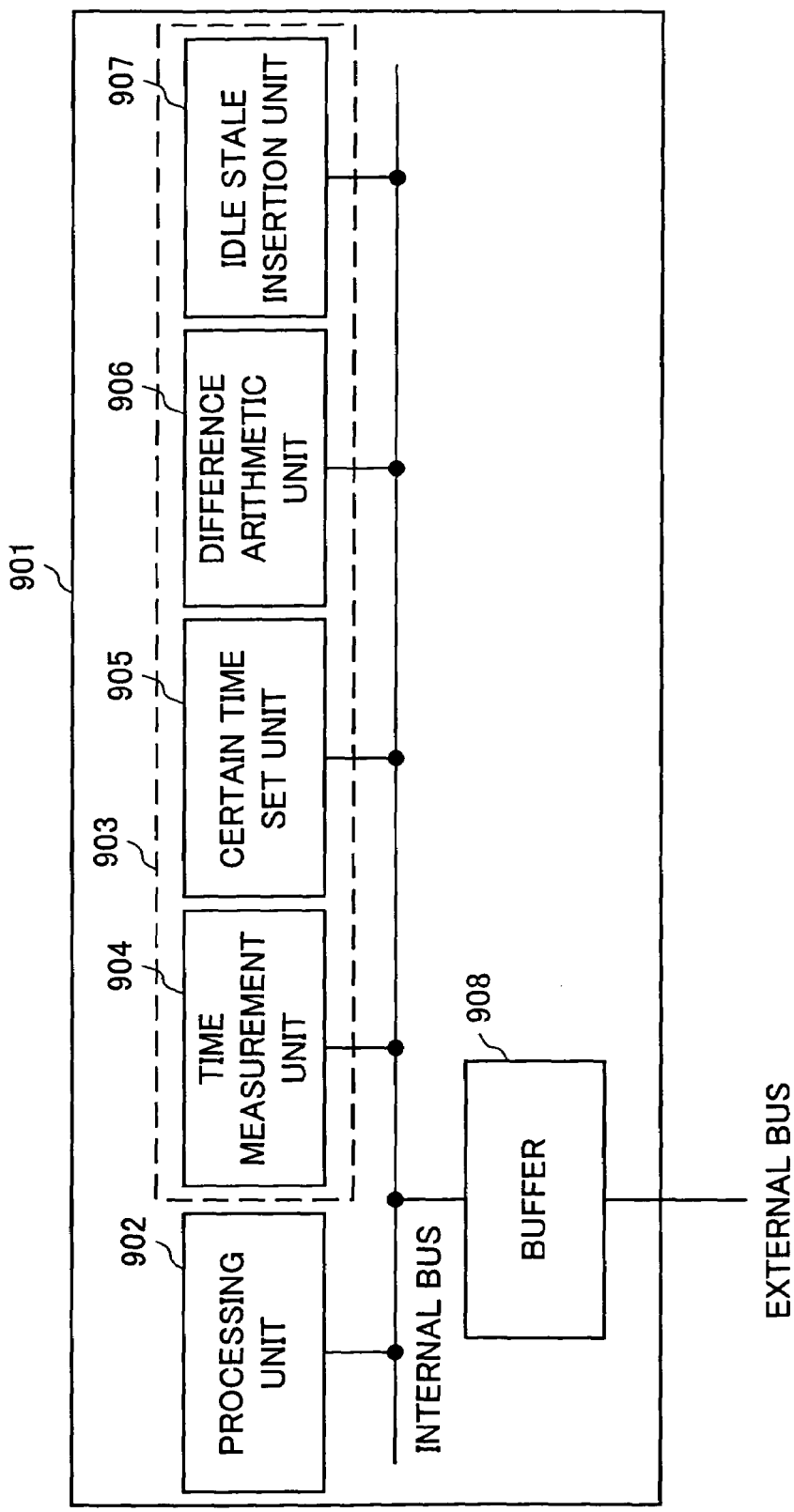
FIG. 1 is a block diagram showing a schematic structure of a conventional microprocessor.
Figure 2:
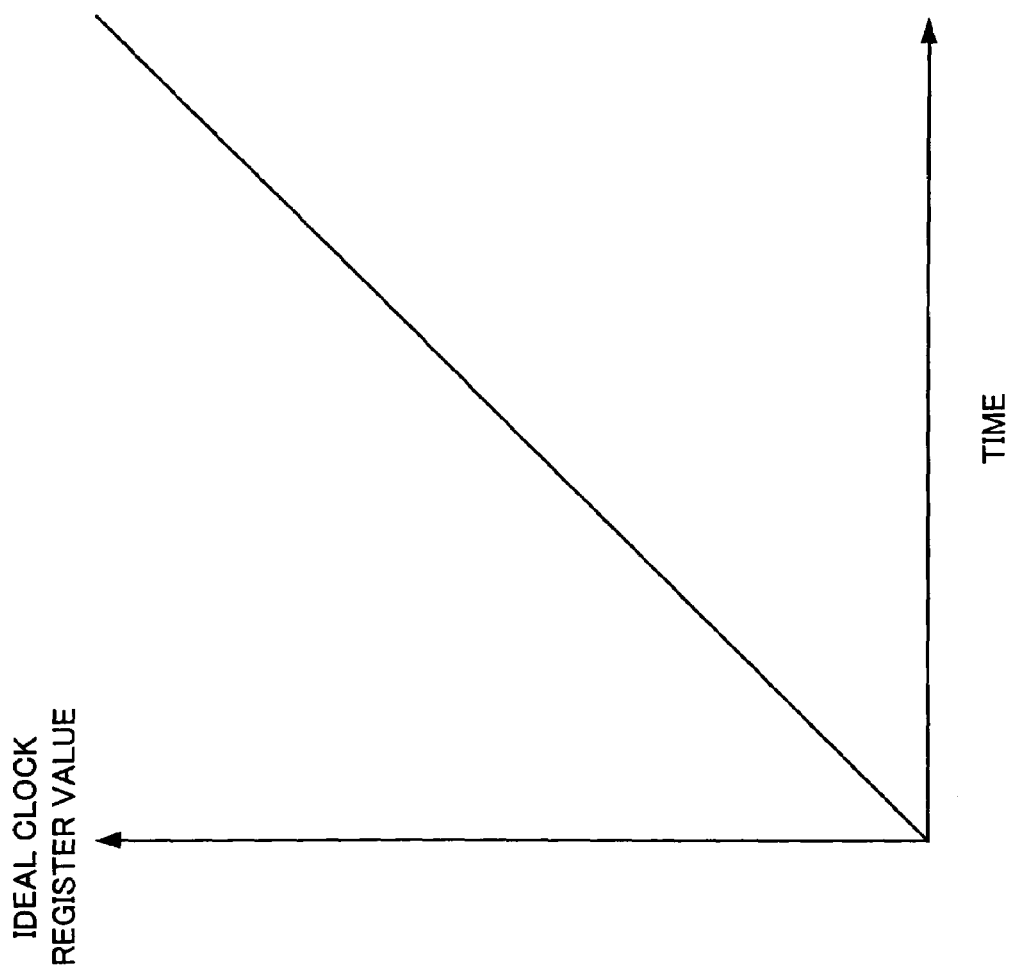
FIG. 2 is a graph showing change in the ideal clock register value.

The ideal clock register value increases at a constant increase rate per unit time. No change occurs by any other cause. FIG. 2 is a graph showing the change in the ideal clock register value. It is appreciated from this graph that the corresponding time is uniquely determined if one ideal clock register value is applied.

The ideal time register value also specifies a time. The time specified by the ideal time register value is identical to the time specified by the ideal clock register value of the same value. Therefore, the corresponding time is uniquely determined if one ideal time register value is applied. Furthermore, if two ideal clock register values or ideal time register values are applied, the succeeding or preceding relationship and time interval of the corresponding two times are also uniquely defined.

Figure 3:
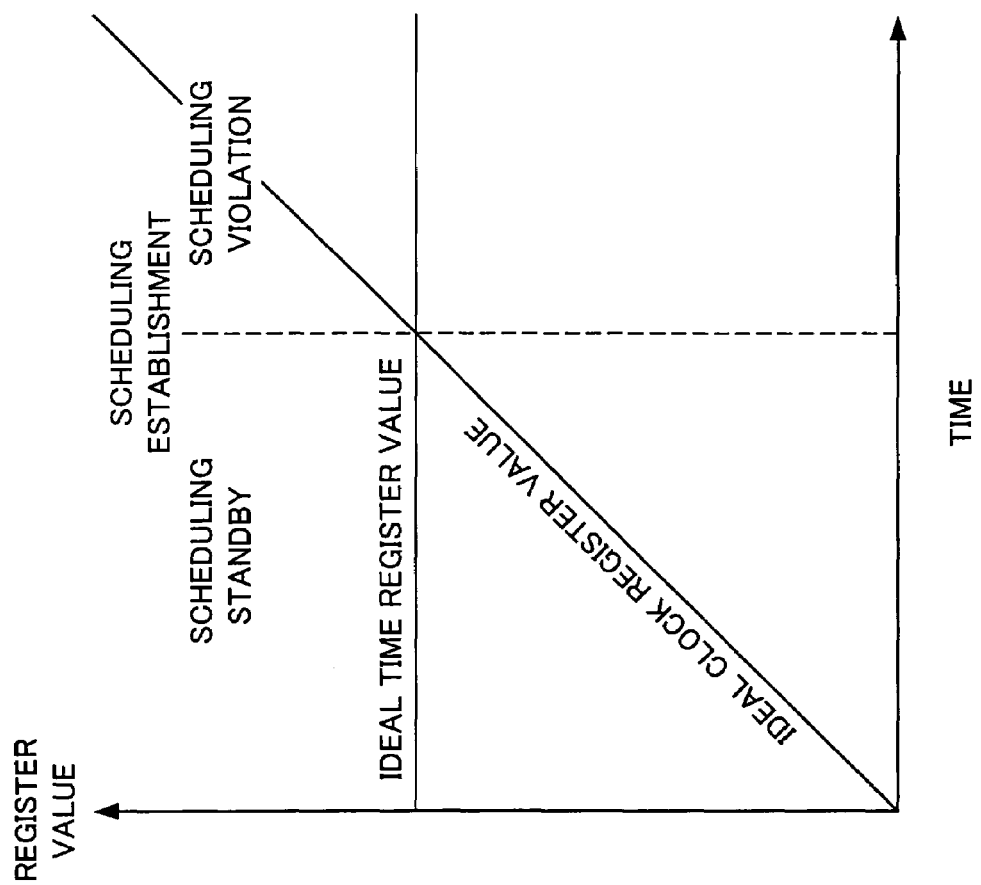
FIG. 3 is a graph showing the relationship between an ideal clock register value and an ideal time register value when the ideal time register value is kept constant.

In the following, the status where the ideal clock register value is smaller than the ideal time register value is referred to as "scheduling standby status". The status where the ideal clock register value is identical to the ideal time register value is referred to as "scheduling establishment status". The status where the ideal clock register value is greater than the ideal time register value is referred to as "scheduling violation status". FIG. 3 is a graph showing the relationship between the ideal clock register value and the ideal time register value when the ideal time register value is kept constant. It is appreciated from FIG. 3 that each status of scheduling standby, scheduling establishment, and scheduling violation can be referred to as the status where respective ideal time register values specify the future time, the current time, and the past time. Therefore, the scheduling status exhibits the transition only in the direction of scheduling standby→scheduling establishment or in the direction of scheduling establishment→scheduling violation as long as the ideal time register value is not updated. Transition from scheduling violation to another status will not occur.

Since the circuit scale is finite, an ideal clock register or an ideal time register cannot be mounted. In the following, the method of realizing an operation approximating that of an ideal clock register and ideal time register will be described using a practical clock register and practical time register.

Figure 4:
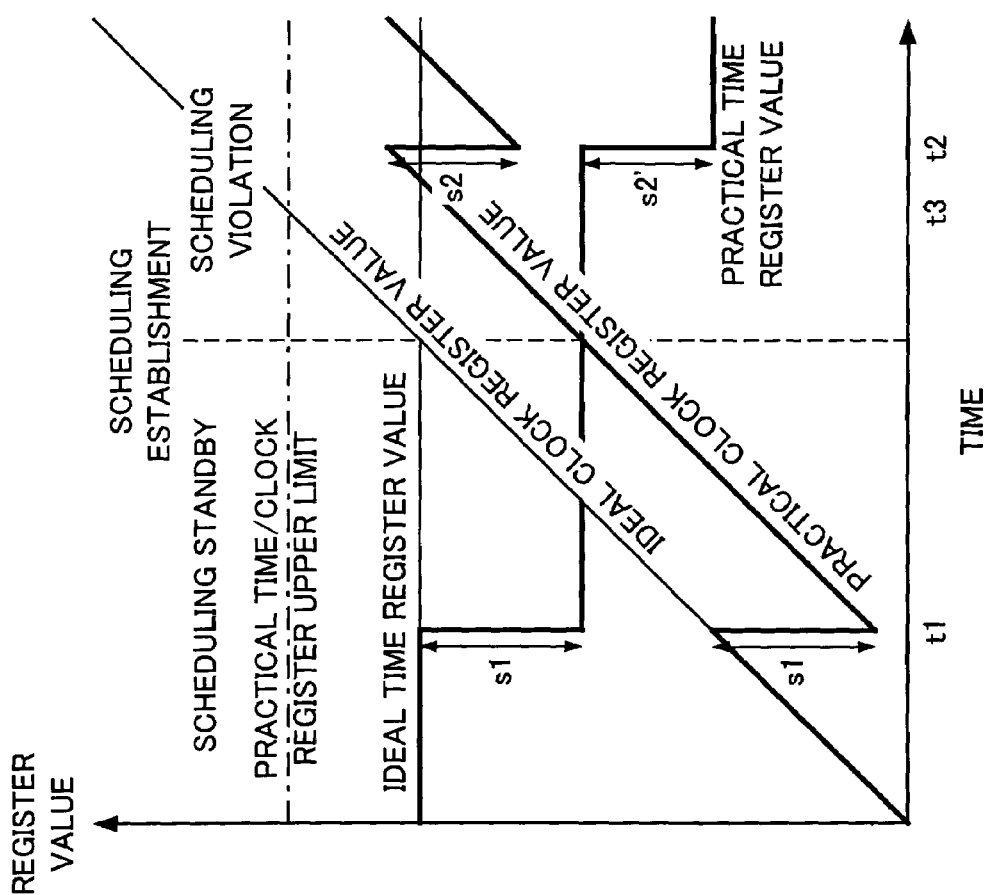
FIG. 4 is a graph showing the relationship among an ideal clock register value, an ideal time register value, a practical clock register value and a practical time register value when the ideal clock register value is kept constant.

FIG. 4 is a graph showing the relationship of the ideal clock register value, ideal time register value, practical clock register value and practical time register value when the ideal time register value is kept constant. The real timer upper limit value is a value determined depending upon the mounting limitation of a practical clock register. It is assumed that the practical clock register value and the practical time register value can vary only in the range of 0 to the real timer upper limit value.

Similarly to the ideal clock register value, the practical clock register value increases at a constant increase rate per unit time, provided that the values are subtracted by s1 and s2 at time t1 and t2, respectively. As a result, the practical clock register value is within the range lower than the real timer upper limit value even after time t3 where the ideal clock register value exceeds the real timer upper limit value. In the following, this subtraction is called "correction", and the value to be subtracted is referred to as "correction value". If the ideal time register value is constant, the practical time register value is also constant, provided that the values are corrected by s1 and s2 at time t1 and t2, respectively, similar to the practical clock register value.

As a result of the practical clock register value and the practical time register value corrected simultaneously with the same correction value, the magnitude relationship between the practical clock register value and the practical time register value completely matches the magnitude relationship between the ideal clock register value and the ideal time register value. Therefore, each status of scheduling standby, scheduling establishment, and scheduling violation can be referred as the state where the practical clock register value is smaller than the practical time register value, the practical clock register value and the practical time register value are identical, and the practical clock register value is greater than the practical time register value, respectively. The period of time from a certain time to the time of scheduling establishment, or the time of elapse from scheduling establishment can be obtained by the difference between the practical clock register value and the practical time register value.

The correction value is determined as set forth in the following. In a scheduling standby status or a scheduling establishment status, a value equal to or lower than the practical clock register value is set as the correction value. In a scheduling establishment status or a scheduling violation status, a value equal to or less than the practical time register value is set as the correction value. Correction must be carried out during the period where the practical clock register value is lower than the real timer upper limit value, i.e., before the practical clock register overflows.

Conversion of a practical clock register value into a ideal clock register value is effected by adding the total of the correction values up to that time point to the practical clock register value. For example, in order to obtain the ideal clock register value corresponding to scheduling establishment in FIG. 4, s1 is to be added to the practical clock register value. Conversion of a practical time register value to an ideal time register value can be effected in a similar manner. In general, a large real timer upper limit value induces complication of the hardware to cause increase in cost. In contrast, conversion from a practical clock register value to a ideal clock register value does not induce a great increase in cost since the conversion can be realized by software.

Assuming that the practical clock register has the size of 32 bits, and one increment is effected for every 5 nanoseconds, the real timer upper limit value becomes approximately $4.2 \times 10^9$, causing an overflow at approximately 21 seconds at most. It is generally easy to carry out at least one correction within this period. A calculation under the same conditions with the value of the ideal clock register value having the accuracy of 64 bits provides a value indicating that overflow will occur by approximately 2900 years. This is a period of time sufficient for practical usage.

In a similar manner, assuming that a practical clock register has a size of 16 bits, and one increment is effected for every 100 microseconds, the real timer upper limit value becomes 65, 536, causing an overflow at approximately 6.6 seconds at most. A calculation with the logic clock register value in the accuracy of 32 bits indicates that an overflow occurs in approximately 5 days. This is a period of time sufficient for practical usage, depending upon its application.

Figure 5:
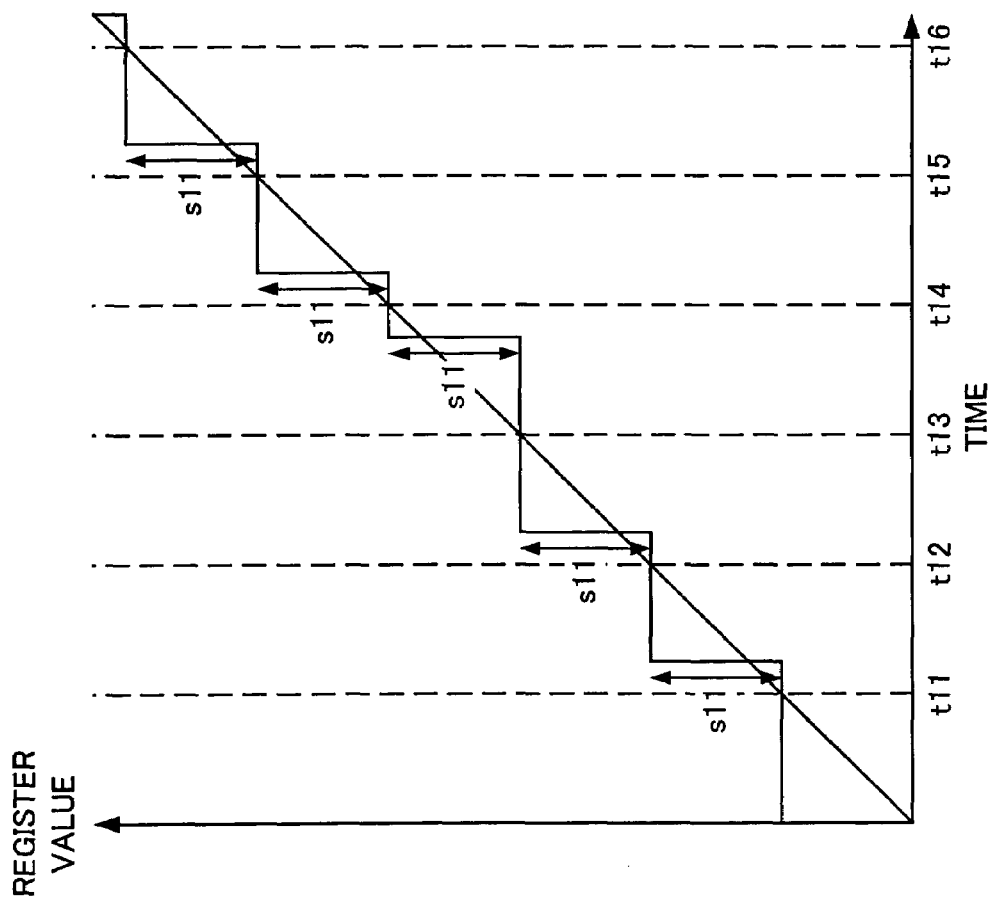
FIG. 5 is a graph corresponding to the case where an event occurs at a constant time interval.
Figure 6:
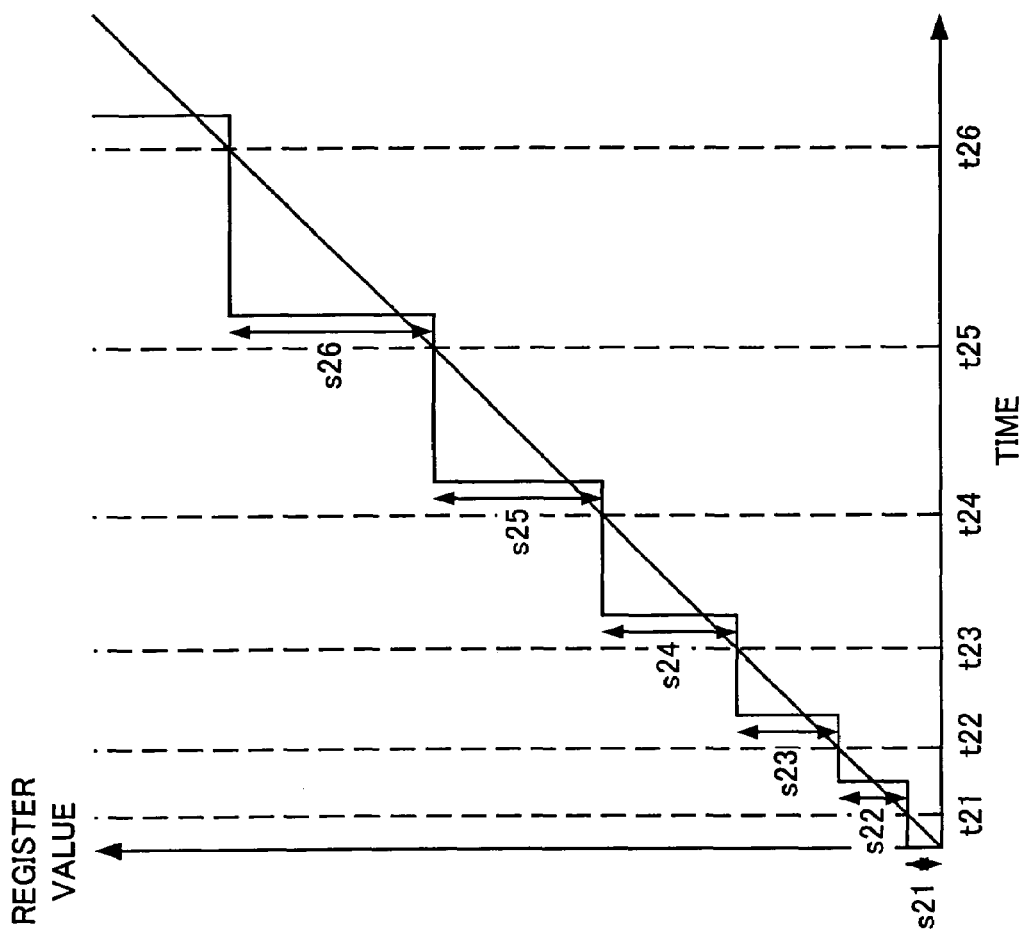
FIG. 6 is a graph corresponding to the case where an event occurs at a time interval that gradually becomes longer at a constant increase rate.
Figure 7:
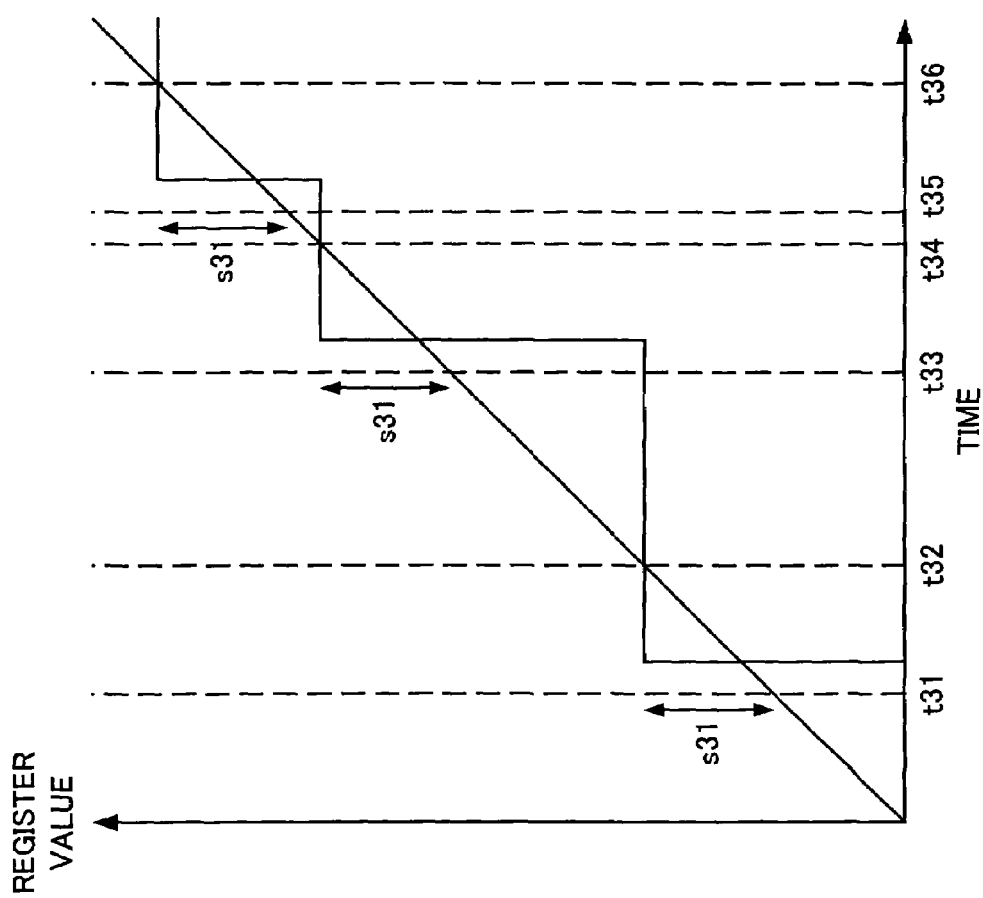
FIG. 7 is a graph corresponding to the case where another event occurs at an elapse of a constant time from the generation of an event.

FIGS. 5–7 are graphs showing the change of the timer value and the time value according to an example of usage of the timer of the present invention. The timer is used to generate an event. The event is generated at the time when the scheduling establishment status is attained. For the sake of simplification, the ideal clock register value and the ideal time register value are shown in the graph.

FIG. 5 is a graph corresponding to the case where an event is generated at a constant time interval. In this example, a constant increase s11 is added to the latest set value in updating the ideal time register value. As a result, a scheduling establishment status is attained at the constant time interval of time t11–t16, whereby the event is generated at the constant time interval.

FIG. 6 corresponds to the case where an event is induced at a time interval that becomes longer at a constant increase. In this example, an increase s2n (n=1, 2, 3 . . . ) that increases at a constant increase rate is added to the latest set value in updating the ideal time register value. Here, s2 (n+1)=s2n+d (d: constant). As a result, a scheduling establishment status is attained at a time interval t21–t26 that becomes longer at a constant increase rate. The event is induced at a time interval that becomes longer at a constant increase rate.

FIG. 7 is a graph corresponding to the case where another event is to be generated at an elapse of constant time from the generation of a certain event. In this example, the ideal time register value is updated to a value corresponding to a constant increase rate s31 added to the ideal clock register value of an event generation that is referred to. As a result, another event is generated at time t32, t34 and t36 corresponding to an elapse of a constant time from the generation time t31, t33 and t35 of the reference event.

In the following, the practical clock register is simply referred to as "clock register" and the practical time register is simply referred to as "time register", unless otherwise noted.

First Embodiment

Figure 8:
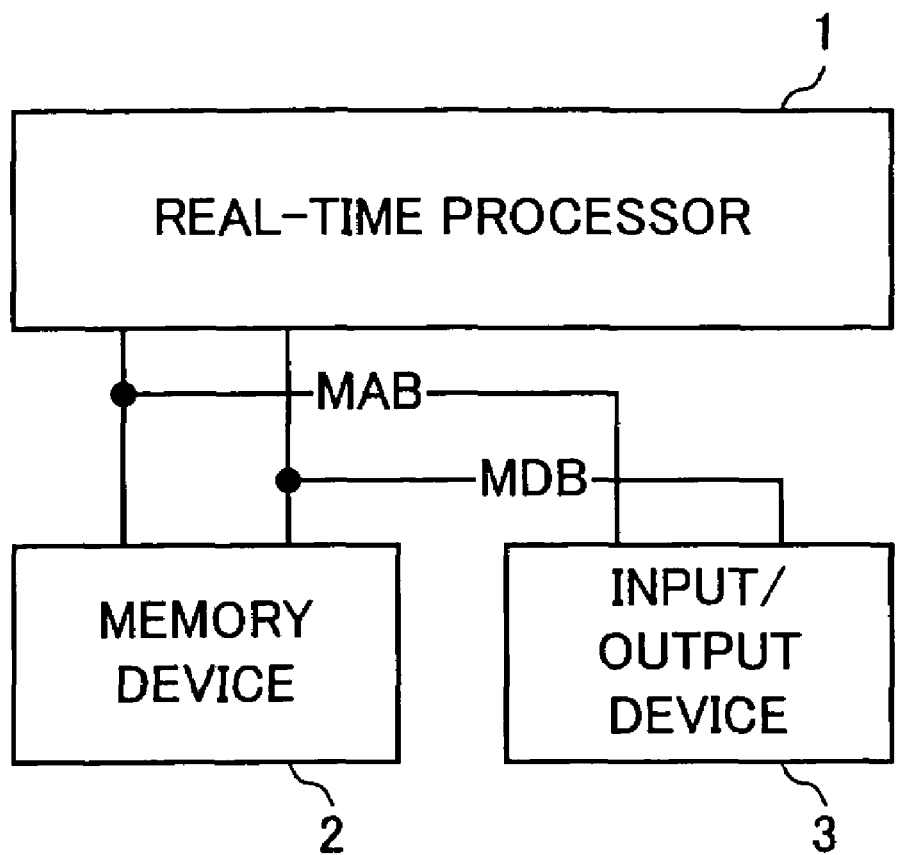
FIG. 8 is a block diagram showing an example of a system employing a real-time processor according to a first embodiment of the present invention.

FIG. 8 is a block diagram showing an example of a system using a real-time processor according to a first embodiment of the present invention. This system includes a real-time processor 1, a memory device 2 in which the program executed by real-time processor 1 and data are stored, and an input/output device 3 to provide data input/output with an external equipment. Real-time processor 1, memory device 2 and input/output device 3 are connected to a memory address bus (MAB) and a memory data bus (MDB). Real-time processor 1 generates a timing signal applied to input/output device 3 to control the same.

The method of real-time processor 1 controlling input/output device 3 includes the method of allocating a control register that controls input/output device 3 to a memory space, to an I/O (Input/Output) space, to a particular internal register, or the like. A system employing the method of allocating a control register to a memory space will be described hereinafter. However, the present invention is not limited to this system, and is applicable to any system employing any of these methods.

Figure 9:
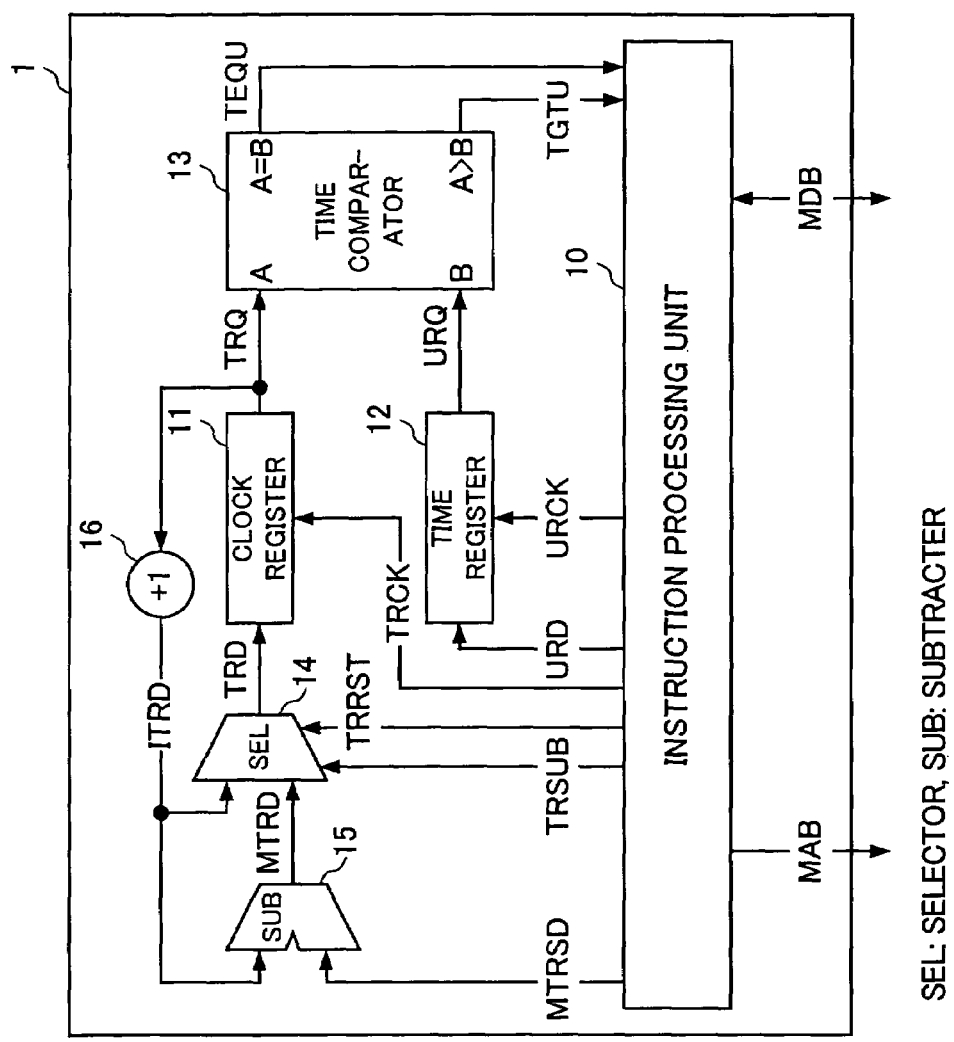
FIG. 9 is a block diagram showing a schematic structure of the real-time processor of the first embodiment.

FIG. 9 is a block diagram showing a schematic structure of a real-time processor according to the first embodiment. The real-time processor includes an instruction processing unit 10 executing a program stored in memory device 2, a clock register 11, a time register 12, a time comparator 13 comparing the value of clock register 11 with the value of time register 12, a selector 14 selecting the value applied to clock register 11, a subtracter 15 subtracting a predetermined value from the value of clock register 11, and an incrementer 16 incrementing the value of clock register 11.

A TRD signal, a TRCK signal, and a TRQ signal are connected to the data input terminal, the clock input terminal, and the output terminal, respectively, of clock register 11. The value of TRD is entered into clock register 11 at the rising edge of TRCK signal to be output as TRQ signal.

An URD signal, an URCK signal, and an URQ signal are connected to the data input terminal, the clock input terminal, and the output terminal, respectively, of time register 12. The value of URD is entered into time register 12 at the rising edge of URCK signal to be output as URQ signal.

A TRQ signal and an URQ signal are connected to input terminals A and B, respectively, of time comparator 13. A TEQU signal and a TGTU signal are connected to one (A=B) and the other (A>B) of the comparator result output terminals. Time comparator 13 compares the values of the two input signals TRQ and URQ to output to TEQU signal a high level (referred to as H level hereinafter) or a low level (referred to as L level hereinafter) when the value of TRQ is equal to or not equal to the value of URQ, respectively. Also, when the value of TRQ is greater than the value of URQ, an H level is output to TGTU signal. When the value of TRQ is equal to or smaller than the value of URQ, an L level is output to TGTU signal.

Selector 14 has one input terminal connected to an ITRD signal and the other input signal connected to a MTRD signal, and also one select signal input terminal connected to a TRRST signal, and the other select signal input terminal connected to a TRSUB signal. When TRRST signal is at an H level, 1 is output to TRD signal irrespective of other input signals. When TRRST signal is at an L level and TRSUB signal is at an L level, the value of ITRD is output as TRD signal. When TRRST signal is at an L level and TRSUB signal is at an H level, the value of MTRD is output as TRD signal. Although TRRST signal is a signal to reset clock register 11, the value output from selector 14 when TRRST signal is at an H level is to set to 1 taking into consideration delay of the value of TRQ by one clock of TRCK signal due to synchronization of the input timing of the value of TRD into clock register 11 with TRCK signal.

Subtracter 15 has one input terminal connected to ITRD signal and the other input terminal connected to MTRSD signal, and the output terminal connected to MRTD signal. Subtracter 15 subtracts the value of MTRSD from the value of ITRD to output the result as MTRD signal. Although subtracter 15 subtracts a predetermined value MTRSD from the value of clock register 11, ITRD signal, not TRD signal, is connected to one input terminal of subtracter 15 taking into consideration the delay of the value of TRQ by one clock of TRCK signal due to synchronization of the input timing of the subtracted result into clock register 11 with TRCK signal.

Incrementer 16 has the input terminal connected to TRQ signal and the output terminal connected to ITRD signal. Incrementer 16 adds 1 to the value of TRQ and outputs the added value as ITRD signal.

Instruction processing unit 10 has the memory address output terminal connected to MAB signal, the memory data input/output terminal connected to MDB signal, one data output terminal connected to MTRSD signal, the other data output terminal connected to URD signal, the clock register initialization output terminal connected to TRRST signal, the clock register subtraction output terminal connected to TRSUB signal, the clock register timing signal output terminal connected to TRCK signal, the time register timing signal output terminal connected to URCK signal, the one time comparison result input terminal connected to TEQU signal, and the other time comparison result input terminal connected to TGTU signal. In order to input/output an instruction and data to/from memory device 2 or input/output device 3, instruction processing unit 10 outputs a memory address as MAB signal, and inputs/outputs readout data or write data by MDB signal. A plurality of control signal lines not shown are required for instruction processing unit 10 to perform memory access or I/O access using signals MAB and MDB. However, these signals are not depicted since they are not directly related to the nature of the present invention. Details of the signals other than MAB and MDB will be described afterwards.

Instruction processing unit 10 has the feature to interpret and execute a group of additional instructions in addition to the set of instructions of a general microprocessor. In the following, the set of instructions of an ARM-7 which is a RISC (Reduced Instruction Set Computer) type processor developed by ARM (Advanced RISC Machines) Corporation is taken as the basic instruction set. A processor with several additional instructions added to this basic instruction set is envisaged. Notation of the program list used in the following description corresponds to the assembler format of ARM Corporation. However, the assembler format of the present invention is not limited to this format. Also, a method of controlling clock register 11, time register 12 and the like which are specific components of the present invention by using an existing instruction set group can be considered, dispensable of additional instructions. For example, a structure that sets a value in time register 12 by writing data into a particular memory address can be implemented.

FIG. 10 shows a list of additional instructions added to instruction processing unit 10 of the present embodiment. ETR refers to clock register 11 whereas EUR refers to time register 12. The operation of each instruction is shown in FIG. 10, and detailed description thereof will not be repeated here.

Figure 11:
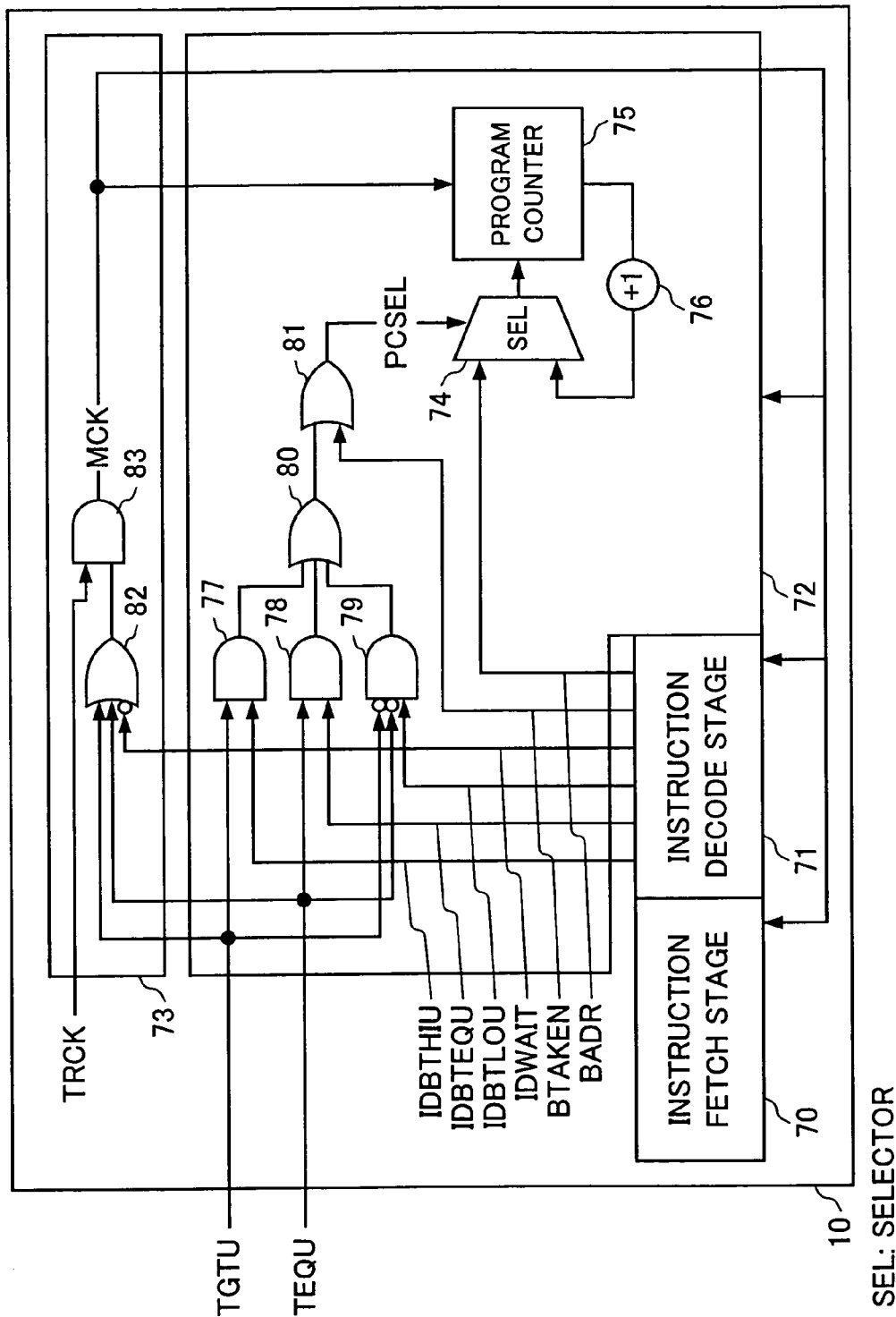
FIG. 11 is a block diagram showing a schematic structure of instruction processing unit 10 of the first embodiment.

FIG. 11 is a block diagram showing a schematic structure of instruction processing unit 10 of FIG. 9. Instruction processing unit 10 includes an instruction fetch stage 70 entering an instruction output from memory device 2, an instruction decode stage 71 decoding and interpreting the instruction entered by instruction fetch stage 70, an instruction execution stage 72 executing an instruction according to the contents interpreted by instruction decode stage 71, and an execution delay circuit 73 delaying the pipe line processes of each of stages 70–71. FIG. 11 is directed to describe the logical operation of instruction processing unit 10 in processing the instructions of WAIT, BTHIU, BTEQU and BTLOU, and do not account for various conditions corresponding to the mounted circuitry such as delay. Although instruction processing unit 10 of FIG. 11 carries out a pipe line process by three stages 70–72, the present invention does not rely on a pipe line structure. The number of stages, the number of functional units, and the like can be set arbitrarily according to the system demand.

Instruction execution stage 72 includes a selector 74 selecting and providing the value of BADR from instruction decode stage 71 or the value from incrementer 76, a program counter 75 storing the storage address of the next instruction to be entered into the instruction pipe line (the stored address in memory device 2), an incrementer 76 incrementing the value stored in program counter 75, and logic gates 77–81. Selector 74 outputs the value of incrementer 76 and the value of BADR from instruction decode stage 71 when PCSEL signal is at an L level and an H level, respectively.

Signals IDWAIT, IDBTHIU, IDBTEQU and IDBTLOU output from instruction decode stage 71 attain an H level when instructions WAIT, BTHIU, BTEQU and BTLOU, respectively, arrive at instruction decode stage 71. Otherwise, respective signals attain an L level. Signal BTAKEN attains an H level when a branch is taken, i.e., an unconditional branch instruction and a conditional branch instruction where a branch condition is established arrive at instruction decode stage 71. BADR signal provides the branch address entered together when the unconditional branch instruction or conditional branch instruction is entered into instruction fetch stage 70.

MCK signal output from execution delay circuit 73 is a clock signal that drives the instruction pipe line (each of stages 70–72), and updates the value of program counter 75.

In the case where WAIT instruction arrives at instruction decode stage 71 when signals TGTU and TEQU are both at an L level, i.e., when in a scheduling standby status, the output of an OR circuit 82 of execution delay circuit 73 is driven to an L level, whereby an AND circuit 83 masks TRCK signal. As a result, supply of MCK signal to the instruction pipeline is stalled, and execution of a WAIT instruction is deferred during the scheduling standby period.

In the case where BTLOU instruction arrives at instruction decode stage 71 when signals TGTU and TEQU are both at an L level, i.e., when in a scheduling standby status, IDBTLOU signal attains an H level, whereby an AND circuit 79 is driven to an H level. PCSEL signal is pulled up to an H level, whereby the branch address is applied to program counter 75 and entered at the rising edge of MCK signal. As a result, a branch is taken when a BTLOU instruction is executed in a scheduling standby status.

In the case where BTEQU instruction arrives at instruction decode stage 71 when TEQU signal is at an H level, i.e., when in a scheduling establishment status, IDBTEQU signal attains an H level and AND signal 78 attains an H level. PCSEL signal is driven to an H level, whereby the branch address is applied to program counter 75 and entered therein at the rising edge of MCK signal. As a result, a branch is taken when BTEQU instruction is executed in a scheduling establishment status.

In the case where BTHIU instruction arrives at instruction decode stage 71 when TGTU signal is at an H level, i.e., when in a scheduling violation status, IDBTHIU signal attains an H level and AND circuit 77 attains an H level. PCSEL signal is driven to an H level, whereby the branch address is applied to program counter 75 and entered therein at the rising edge of MCK signal. As a result, a branch is taken when BTHIU instruction is executed in a scheduling violation status.

By the above-described structure, an instruction processing unit 10 that processes the instructions of WAIT, BTHIU, BTEQU and BTLOU can be realized. Execution of instructions WLD, WSTR, WINR and WOUTR can be delayed by a method similar to that of WAIT instruction. By implementing an instruction processing unit in which IDWAIT signal attains an H level when WPREFIX instruction is in instruction execution stage 72, execution of a qualified instruction can be delayed.

Figure 13:
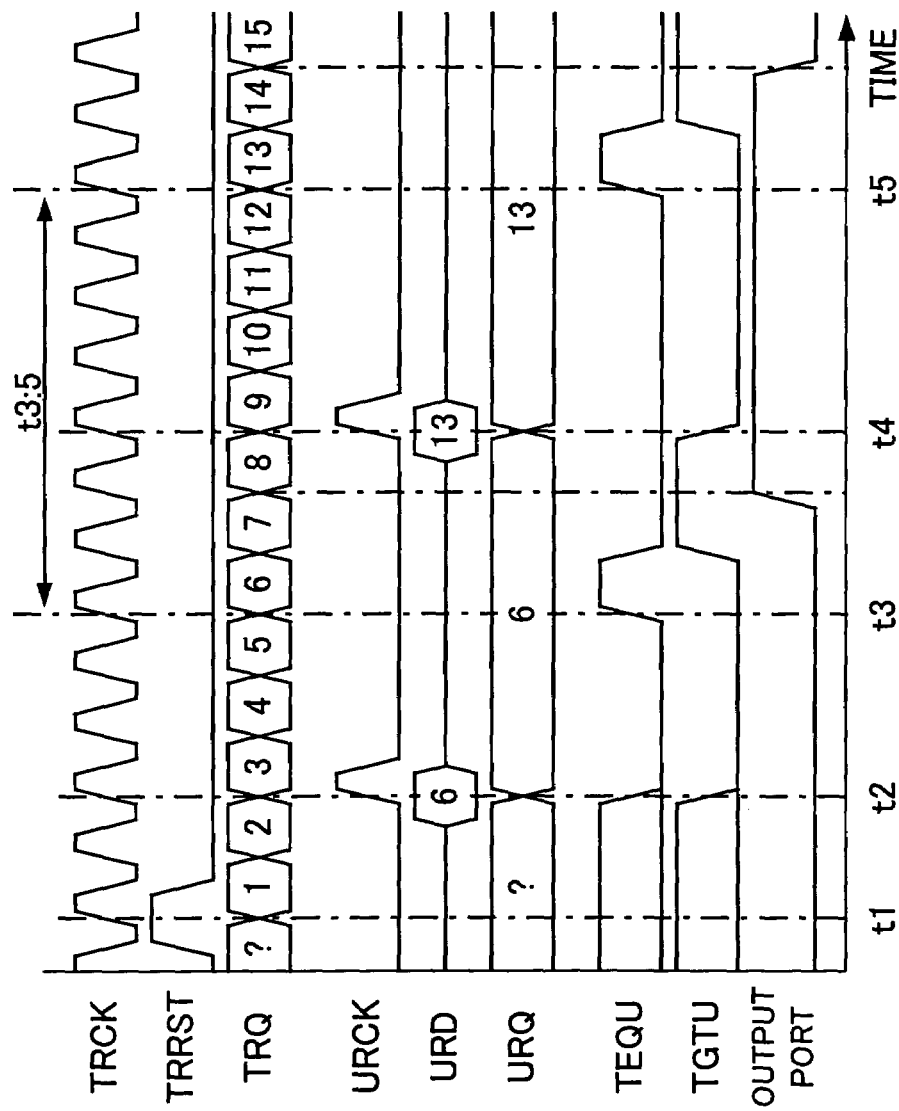
FIG. 13 is a timing chart of the operation timing corresponding to the case where instruction processing unit 10 of the first embodiment executes the program of FIG. 12.

FIG. 12 shows an example of a program using the additional instructions of FIG. 10. This program outputs an H level for a predetermined time (time t3–t5) at the output port to control input/output device 3. An instruction of a line number denoted with * implies an additional instruction. FIG. 13 is a timing chart representing an operation timing corresponding to the case where instruction processing unit 10 executes the program of FIG. 12.

First, preparation is made to access the output port (lines 1–3). More specifically, the output port address "port" is set at register R0 (line 1); the value "on" output to the output port (the value to turn on) is set at register R1 (line 2); and the value "off" output to the output port (the value to turn off) is set at register R2 (line 3).

Then, clock register ETR is initialized to 1 (line 4; this time is set as t1). Upon execution of this instruction by instruction processing unit 10, TRRST signal provides an H level as shown in FIG. 13, whereby 1 is output to TRD signal by selector 14. As a result, clock register 11 is initialized at the timing of t1 from which measurement of the time is initiated. This initialization of the clock register has to be carried out only once in the initialization of the system. The process of preventing the clock register from overflowing will be described afterwards.

Next, time register EUR is set to 6 (line 5; this time is set as t2). As shown in FIG. 13, the value 6 of URD is set in time register 12 at the timing of t2. When the values of clock register ETR and time register EUR are set at lines 4 and 5, signals TEQU and TGTU output from time comparator 13 are ascertained at the L level.

Then, WAIT instruction is executed (line 6). When this WAIT instruction arrives at instruction decode stage 71, update of program counter 75 is suppressed, and the process of the instruction pipe line is inhibited during the scheduling standby status, i.e., until the value of clock register 11 becomes 6. When clock register 11 attains the value of 6 (this time is set as time t3), an H level is provided to TEQU signal. Update of program counter 75 and entry, interpretation and execution of an instruction are resumed. The output port is turned on (H level) (line 7). Then, time register 12 is set to 13 (line 8; this time set as time t4), and a WAIT instruction is executed again (line 9).

When the value of clock register 11 attains 13 (this time is set as timer t5), update of program counter 75 is resumed, and the output port is turned off (L level) (line 10). Time t3:5 (the time from tm to tn is expressed as tm:n hereinafter) accurately matches the period of time corresponding to clock register 11 counting 7. This count number is determined by the difference (13−6) of the value set in time register 11. When the delay time before the output port is actually turned on by the instruction of line 7 from time t3 is identical to the delay time before the output port is actually turned off by the instruction of line 10 from time t5, the turn on period of the output port, i.e., the pulse length, correctly matches the period of time clock register 11 advances its count to 7 (refer to the timing of the output port of FIG. 13).

When a STR instruction is described following a WAIT instruction as in the program of FIG. 12, there is an elapse of a period of time from completion of the execution of a WAIT instruction up to writing into a memory (output port) by the STR instruction. Therefore, the write timing into the memory (output port) is later than the time set in time register 12. The time starting from the end of execution of a WAIT instruction to execution of the next instruction is referred to as "delay time" hereinafter.

By the same reason, there is a delay time from the end of execution of a WAIT instruction to the read out from the memory (input port) by an LDR instruction in the case where an LDR instruction is described after a WAIT instruction. Therefore, the read out timing from the memory (input port) is later than the time set in time register 12.

In the case where the mechanism that becomes the cause of change in the memory access time such as of a cache memory is incorporated in the system with the real-time processor of the present embodiment, the delay time varies in a complicated manner. It is therefore difficult to carry out input/output to/from the memory (input/output port) correctly at a predetermined time. Even if the delay time is constant, there is a problem that the value set in time register 12 must be determined taking into consideration the delay time.

Instructions WLDR and WSTR shown in FIG. 10 are directed to solve such problems. These instructions are additional instructions to allow access to a memory at a predetermined time. Upon initiation of executing these instructions by instruction processing unit 10, the memory address is output to MAB signal, and then the process is temporarily suppressed to delay data input/output with respect to the memory. Upon attaining the status of scheduling establishment or scheduling violation, instruction processing unit 10 resumes the process to input/output data with respect to the memory. Usage of these instructions WLDR and WSTR allows data to be input/output properly with respect to the memory at a predetermined time impervious to the delay time. Instructions WINR and WOUTR differ from instructions WLDR and WSTR only in the feature that they are data input/output instructions with respect to I/O, not the memory. Therefore, detailed description thereof will not be repeated.

Instructions that causes the processor to be subjected to an external effect or that applies an effect other than the memory access instructions and input/output instructions with respect to I/O can be delayed similarly. A coprocessor control instruction can be cited as an example of such an instruction.

Figure 15:
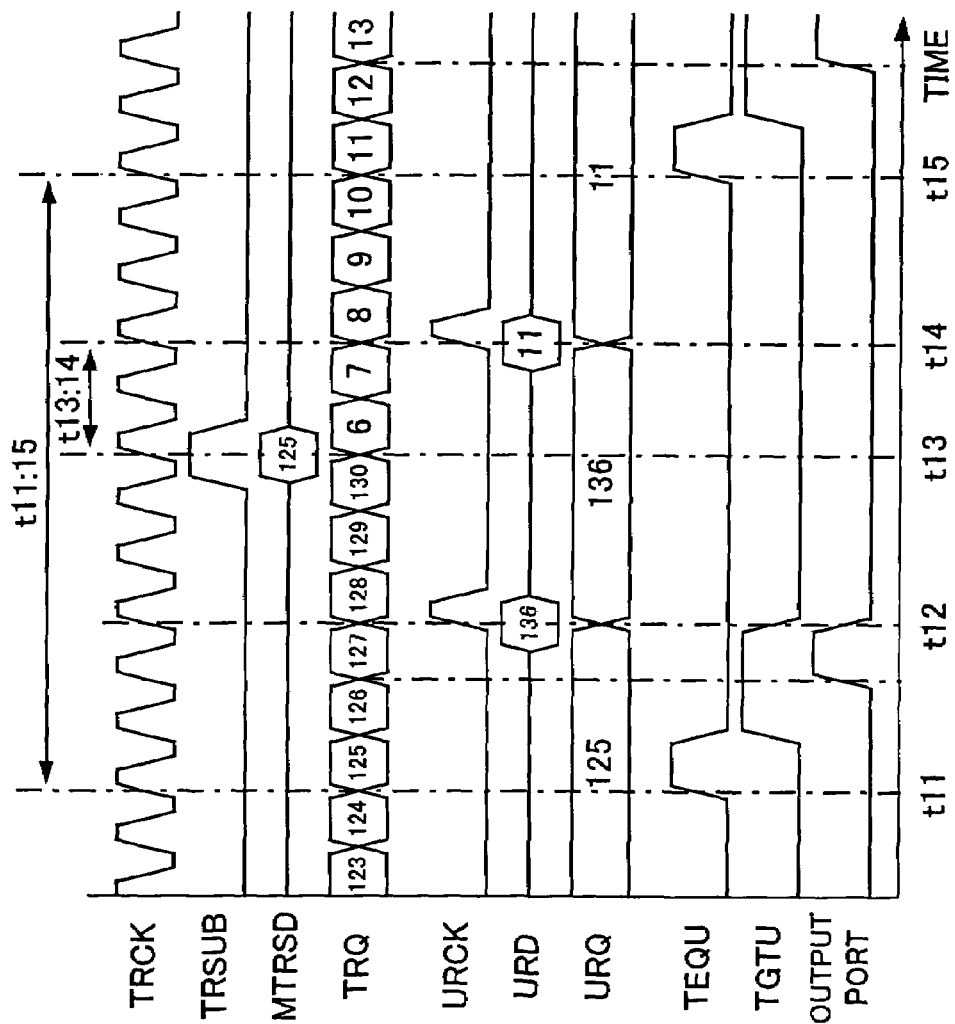
FIG. 15 is a timing chart showing the operation timing corresponding to the case where instruction processing unit 10 of the first embodiment executes the program of FIG. 14.

FIG. 14 shows another example of a program using the additional instructions of FIG. 10. This program outputs the pulse at a predetermined time interval to the output port to control input/output device 3. This program accommodates overflow of clock register 11 in order to continue the loop infinitely. FIG. 15 is a timing chart representing the operation timing corresponding to the case where instruction processing unit 10 executes the program of FIG. 14.

First, preparation is made to access the output port (lines 1–3). More specifically, an output port address "port" is set in register R0 (line 1); the value "on" output to the output port (the value to turn on) is set in register R1 (line 2); and the value "off" output to the output port (the value to turn off) is set in register R2 (line 3).

The output time of 4 for the first pulse is set in register R3 (line 4). Upon initialization of clock register ETR to 1 (line 5), the value 4 of register R3 is set in time register EUR (line 6). Register R3 is used as a work register to calculate the time to output the next pulse. In a more complicated program, it is desirable to allocate this register in a work area in memory device 2.

Lines 7–18 form an infinite loop. Time register 12 is first set to 4, and then set to the values of 15, 26 and 37, each corresponding to an increase of 11. The timing chart of FIG. 15 represents the timing of each signal after register 12 is set to 125 following the output of a pulse 11 times and clock register 11 counts up to 123.

Then, a WAIT instruction is executed (line 7). Upon arrival of this WAIT instruction at instruction decode stage 71, update of program counter 75 is suppressed, and a scheduling standby status is attained. The process of the instruction pipe line is suppressed until the value of clock register 11 becomes 125. When the value of clock register 11 becomes 125 (this time is set as t11), an H level is output to TEQU signal. Update of program counter 75 is resumed. The output port is turned on (H level) (line 8), and then the output port is turned off (L level) (line 9), whereby a pulse is output.

Then, 11 is added to register R3, and the next pulse output time "136" is calculated (line 10). Time register 12 is reset to 136 (line 11; this time is set as t12). The value of register R3 (the value set in time register 12) is compared with 128 (line 12). This process is carried out to confirm that the value set in time register 12 is less than the defined value. When the value set in time register 12 is less than the defined value, control branches to label L1 to execute the process of lines 7 and et seq.

When the value set in time register 12 is equal to or greater than the defined value, 11 is subtracted from the value of register R3, and inserted into register R4. This value is set as the correction value (line 14). This process is aimed to obtain an appropriate correction value so that the corrected result does not attain a negative value. The previous value set in time register 12 is set as the correction value.

Then, the value of register R4 (correction value) is subtracted from clock register ETR (line 15; this time is set as t13). The value of register R4 (correction value) is subtracted from register R3 in which the next pulse output time is stored. This subtracted value is inserted into register R3 (line 16). The value of register R3 (corrected time) is inserted into time register EUR (line 17; this time is set as t14), and control branches to label L1 (line 18). When instruction processing unit 10 executes the subtraction instruction of line 15, correction value 125 is output to MTRSD. The corrected value is set in clock register 11 by subtracting the value of MTRSD from the value of ITRD through subtracter 15. Here, TRSUB signal attains an H level, and the value of MTRD is selected by selector 14.

Thus, the correction value is subtracted from the value of clock register 11 at the timing of t13, and the same correction value is subtracted from the value of time register 12 at the timing of t14. Therefore, time interval t11:15 correctly matches the time of clock register 11 advancing the count of 11 even when there is the correction process.

Thus, overflow of clock register 11 can be prevented by the correction process. It must be noted that the relationship of the two registers is not accurate during the period starting from correction of clock register 11 up to correction of time register 12, i.e., during the period corresponding to t13:14 of FIG. 15. Therefore, the process must be performed speedily so that the correction process is completed before the time set in time register 12.

The time interval that requires a correction process depends upon the time that can be measured by clock register 11. Assuming that clock register 11 is 32 bits and the frequency of TRCK signal is 200 MHz, correction is to be carried out once in approximately 21 seconds. Although this period of time of approximately 21 seconds is not so long as to render correction dispensable, this restriction of carrying out the correction process at least once during this period is of no concern. When the frequency of TRCK signal set to 200 MHz as mentioned before, the output port can be controlled in units of 5 nsec. This is by no means inferior to control by a dedicated hardware.

Instructions BTLOU, BTEQU and BTHIU are instructions that branches are taken in scheduling standby, scheduling establishment and scheduling violation, respectively. It is to be noted that these instructions have execution promptly completed without cessation of the instruction execution, differing from the WAIT instruction. Therefore, these instructions are effective for an application in a status where stall of an instruction execution is not desirable.

FIG. 16 shows an example of a program using a BTHIU instruction. This program is directed to output an H level to the output port at a predetermined time.

First, preparation is made to access the output port (lines 1–2). More specifically, the output port address is set to "port" in register R0 (line 1). The value "on" to be output to the output port is set in register R1 (line 2).

Then, the time to turn the output port on is set in register R2 (line 3). Clock register ETR is initialized to 1 (line 4). 100 is subtracted from register R2, and the subtracted result is set in register R3, whereby the preparation start time is obtained (line 5). That value is set in time register 12 (line 6).

Determination is made whether the time in clock register 11 has passed the preparation start time set in time register 12 (line 7). If the value in clock register 11 has passed the preparation start time, the process proceeds to subroutine "background" (line 8) is called. This subroutine "background" is a procedure that is completed within a time of margin, executed on the assumption that there is time to spare before the output port is turned on when the current time is before the preparation start time. Upon returning from subroutine "background", the process branches to label L1 (line 9).

When the value of clock register 11 is later than the preparation start time, the process branches to label L2. The value of register R2, i.e., the time to turn on the output port, is set in time register 12 (line 10). Execution is suppressed until the time when the output port is turned on (line 11).

When the value of clock register 11 corresponds to the time to turn on the output port, the output port is turned on (line 12).

Thus, when there is extra time before the predetermined time, another process can be executed without having to stop instruction execution facility 10, and the predetermined operation can be carried out at the predetermined time.

WPREFIX instruction is a time qualify instruction indicating that the next instruction is a time dependent instruction, and specifies that execution of the next instruction is to be delayed during the scheduling standby time. For example, when a STR instruction is described after a WPREFIX instruction, writing into the memory by a STR instruction is delayed during the schedule standby period. Usage of this WPREFIX instruction allows an equal operation to be carried out by instruction processing unit 10 without adding the above-described instruction such as WSTR instruction. An advantage similar to that where a plurality of time dependent instructions are added can be provided by just adding one time qualify instruction. This is effective in the case where many instructions are added to the basic instruction set and there is no room to assign respective unique codes.

According to the real-time processor of the present embodiment, clock register 11 is continuously updated at a constant time interval. The operation such as initialization and the like that renders the succeeding/preceding relationship of the time ambiguous becomes eliminated. Therefore, an elapse time between arbitrary times can be specified. Also, since a predetermined time can be subtracted from clock register 11, the value of clock register 11 can be corrected prior to overflow thereof.

Since the match or magnitude comparison between the value of clock register 11 and the value of time register 12 is carried out by time comparator 13, occurrence of scheduling standby, scheduling establishment or scheduling violation can be detected. Since instruction processing unit 10 executes the instruction of carrying out branching or delaying instruction execution depending upon the comparison result by time comparator 13, the program process flow can be controlled according to the three status of scheduling standby, scheduling establishment and scheduling violation.

Second Embodiment

Figure 17:
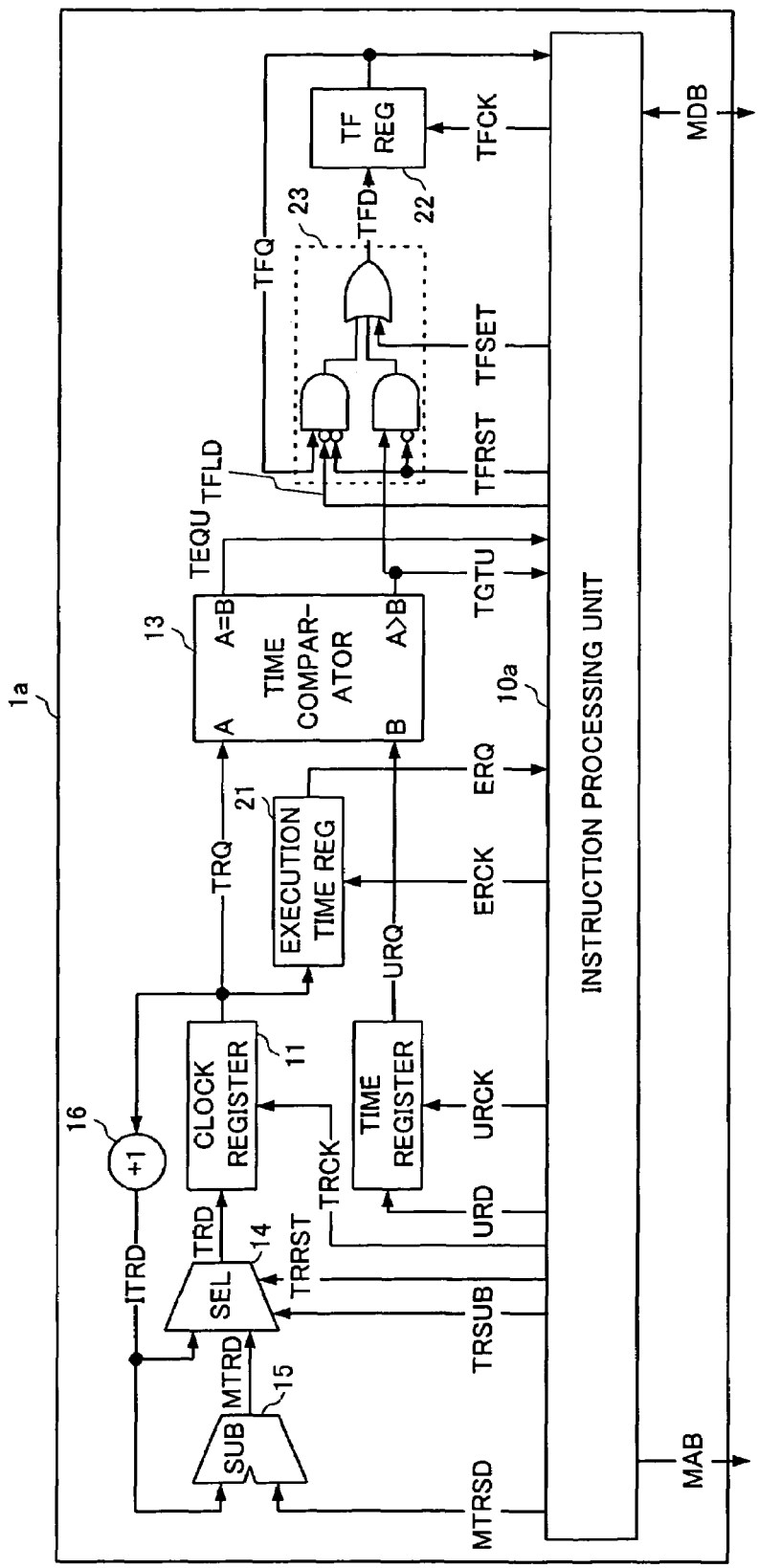
FIG. 17 is a block diagram showing a schematic structure of a real-time processor according to a second embodiment of the present invention.

FIG. 17 is a block diagram showing a schematic structure of a real-time processor according to a second embodiment of the present invention. The real-time processor of the second embodiment differs from the real-time processor of the first embodiment shown in FIG. 9 in that an execution time register 21, a TF register 22 and a combination logic circuit 23 are additionally provided and the instruction processing unit further includes the feature of controlling these additional circuits. Detailed description of the same structure and function will not be repeated. In the second embodiment, the real-time processor is designated 1a and the instruction processing unit is designated 10a.

Execution time register 21 has the data input terminal connected to TRQ signal, the clock input terminal connected to ERCK signal, and the output terminal connected to ERQ signal. The value of TRQ is entered in execution time register 21 at the rising edge of ERCK signal to be output as ERQ signal.

TF register 22 has the data input terminal connected to TFD signal, the clock input terminal connected to TFCK signal, and the output terminal connected to TFQ signal. The value of TFD is entered in TF register 22 at the rising edge of TFCK signal to be output as TFQ signal.

Combination logic circuit 23 has the input terminal connected to signals TFQ, TFLD, TFRST, TGTU and TFSET, and the output terminal connected to TFD signal. Signals TFLD, TFRST and TFSET are connected so that two or more signals do not attain an H level.

When TFRST signal is at an H level, TFD signal is driven to an L level. TF register 22 is cleared at the rising edge of TFCK signal. When TFSET signal is at an H level, TFD signal attains an H level, and TF register 22 is set at the rising edge of TFCK signal. When TFLD signal is at an H level, the value of TGTU is output as TFD signal to be set in TF register 22 at the rising edge of TFCK signal. When TFLD signal is at an L level at the rise of TFCK signal, the set value in TF register 22 is maintained. The value of TF register 22 is referred to by instruction processing unit 10a as a T flag.

FIG. 18 shows a list of instructions added to the real-time processor of the present embodiment. The operation of respective instructions is shown in FIG. 18. Therefore, detailed description thereof will not be provided here.

Figure 20:
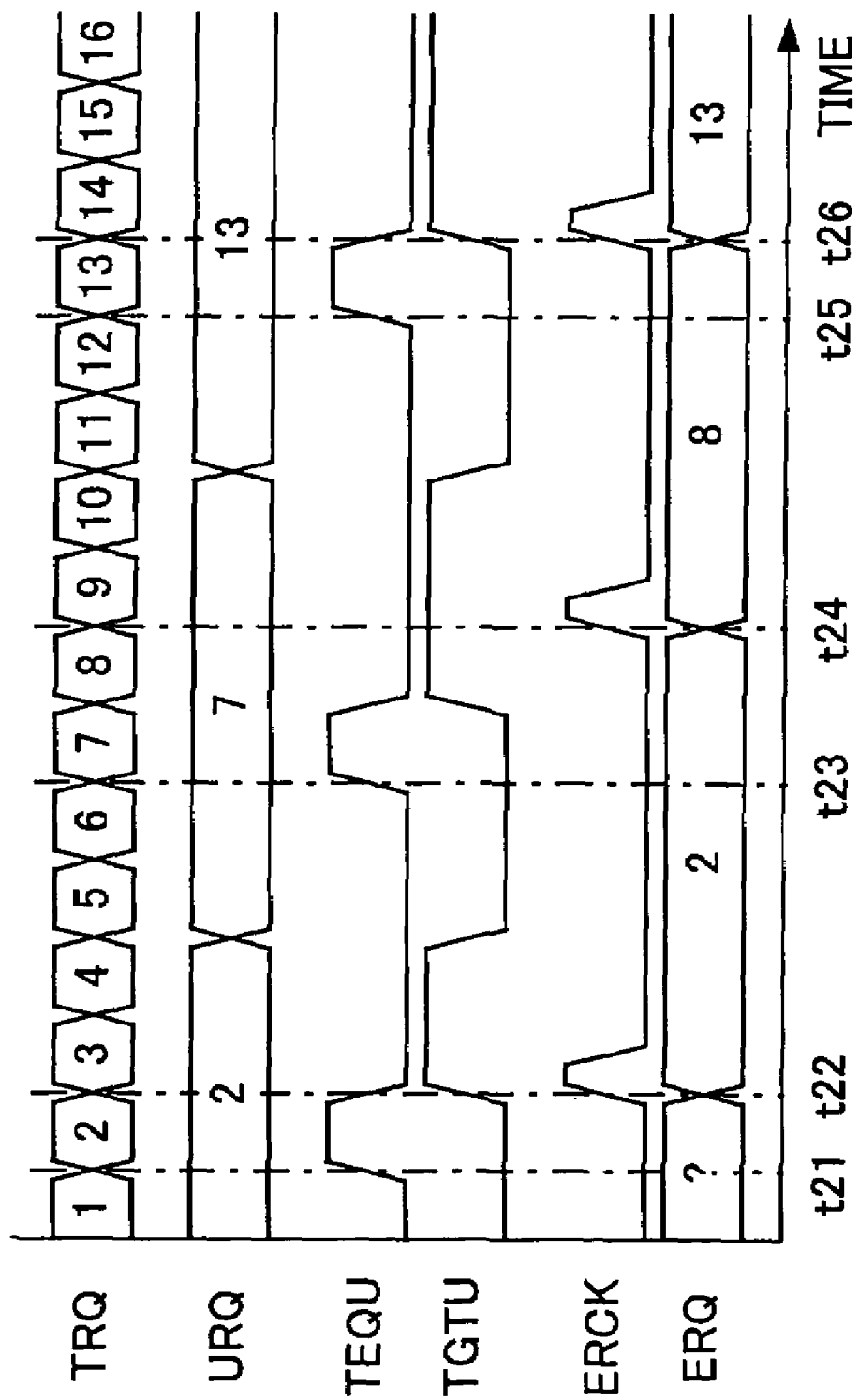
FIG. 20 is a timing chart showing the operation timing corresponding to the case where instruction processing unit 10a of the second embodiment executes the program of FIG. 19.

FIG. 19 shows an example of a program using the additional instructions of FIG. 18. This program detects scheduling violation using execution time register 21 to carry out a recovery procedure. FIG. 20 is a timing chart representing an operation timing corresponding to the case where instruction processing unit 10a executes the program of FIG. 19.

First, 2 is set in time register 12 (line 1). Instruction execution completion is delayed until the value of clock register 11 becomes at least the value of time register 12, i.e. during the period of scheduling standby status (line 2). When the value of clock register 11 becomes 2 to attain the scheduling establishment status, the value of clock register 11 when execution is completed, i.e. 2, is set in execution time register 21. When scheduling establishment is detected by instruction processing unit 10a, instruction processing unit 10a outputs a pulse to ERCK signal at the timing of t22, as shown in FIG. 20. At the rising edge thereof, the value of TRQ output from clock register 11 is entered into execution time register 21, whereby 2 is output to ERQ signal.

Then, 7 is set in time register 12 (line 3), and the process proceeds to a subroutine "subroutine" where the execution time is indefinite fine 4). When the process returns from this subroutine, WMOV instruction is executed again (line 5). It is assumed that WMOV instruction is executed later than the specified time "7" (the timing indicated at t23 in FIG. 20) since execution of subroutine "subroutine" was unexpectantly time consuming. At this current stage, scheduling violation has occurred (the timing indicated at t24 of FIG. 20), so that 8 is set in execution time register 21 although 7 is set in time register 12. As a result of comparing the value of execution time register 21 with the set value "7" (line 6), the process proceeds to the recovery procedure subroutine "recover" since the value of execution time register 21 is greater than the set value (line 7).

When the process returns from recovery procedure subroutine "recover", 13 is set in time register 12 (line 8), and WMOV instruction is executed again (line 9). When execution of this WMOV instruction is completed (the timing indicated at t25 in FIG. 20), the value in clock register 11 becomes 13. The value of "13" is set in execution time register 21 at the timing of t26. Then, the value of execution time register 21 is compared with the specified time "13" (line 10). Since scheduling violation is not detected by this comparison, the process does not proceed to the recovery procedure subroutine "recover" (line 11), and execution of the next instruction is performed. By comparing the value of execution time register 21 with a specified time, scheduling violation can be detected to carry out a recovery procedure thereof.

Figure 22:
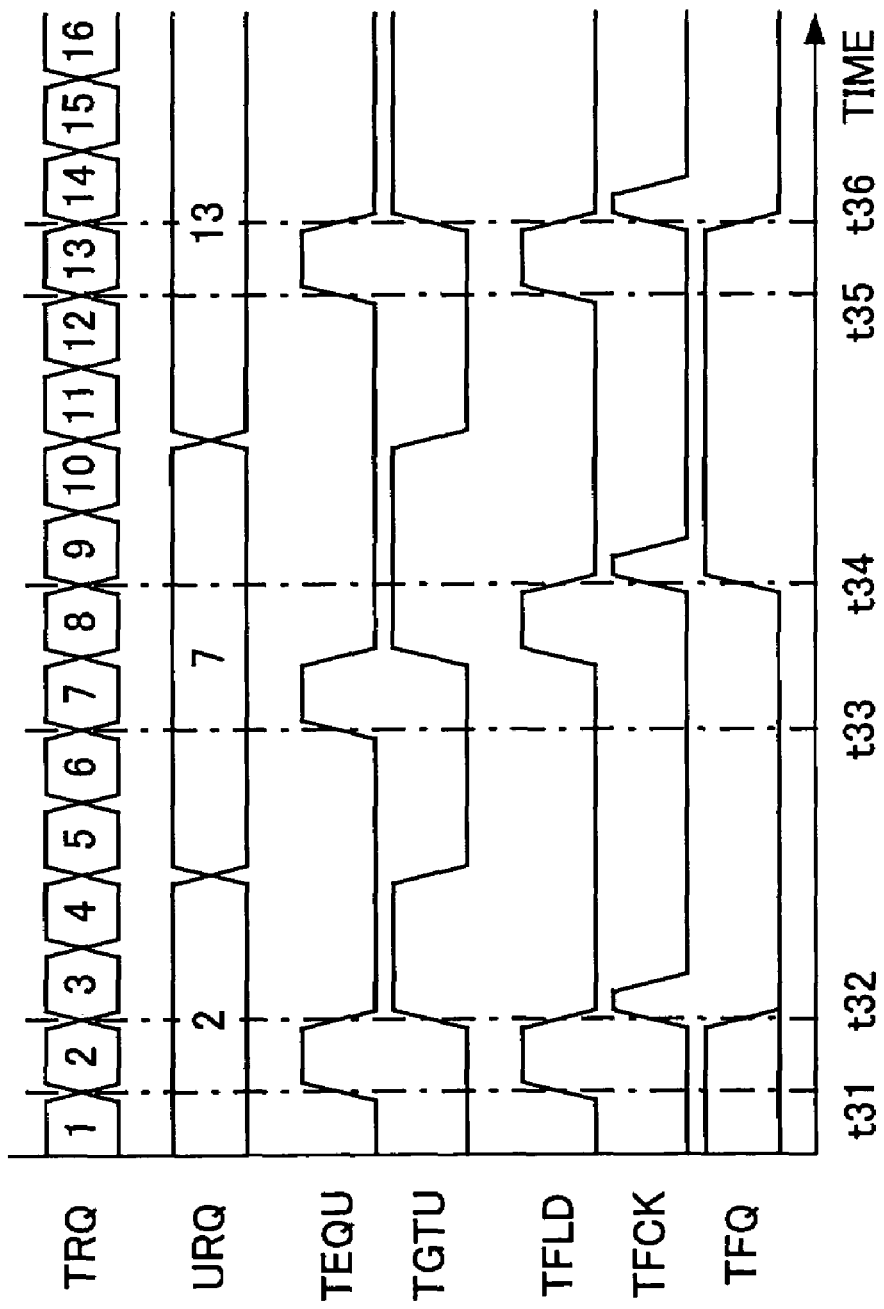
FIG. 22 is a timing chart representing an operation timing corresponding to the case where instruction processing unit 10a of the second embodiment executes the program of FIG. 21.

FIG. 21 shows another example of a program using the additional instructions of FIG. 18. This program detects scheduling violation using a WAIT2 instruction and a T flag shown in FIG. 18. T flag is a conditional flag that varies according to WAIT2 instruction or WAIT3 instruction, and matches the value set in TF register 22 of FIG. 17. FIG. 22 is a timing chart representing an operation timing corresponding to the case where instruction processing unit 10a executes the program of FIG. 21.

First, specified time "2" is set in time register 12 (line 1). Following suppression of execution until the specified time, T flag is updated (line 2). Completion of instruction execution is delayed until the timing of t31 in FIG. 22. T flag is updated at the timing of t32. At t32, T flag is cleared since a scheduling establishment status is attained (L level of TGTU signal).

Then, specified time "7" is set in time register 12 (line 3). Then the process proceeds to subroutine "subroutine" where the execution time is indefinite (line 4). When the process returns from subroutine "subroutine", execution is suppressed until the specified time, and then T flag is updated (line 5). It is assumed that WAIT2 instruction is executed later than the specified time of 7 (the timing of t33 in FIG. 22) since execution of subroutine "subroutine" was unexpectantly time consuming. At this stage, scheduling violation has occurred (timing of t34 in FIG. 22), and TFQ signal output from TF register 22 attains an H level.

Since T flag is set, branching to label OK1 is not taken (line 6), and the process proceeds to recovery procedure subroutine "recover" (line 7). When the process returns from recovery procedure subroutine "recover", specified time "13" is set in time register 12 (line 8). Following suppression of execution until the specified time (timing of t35 in FIG. 22), T flag is specified (line 9). At this current stage, a scheduling establishment status is attained (L level of TGTU signal). Therefore, T flag is cleared at the timing of t36 in FIG. 22.

Determination is made whether scheduling violation has occurred or not (line 10). Since T flag is cleared, branching to label OK2 is taken. The process of recovery procedure subroutine "recover" is not carried out.

Figure 24:
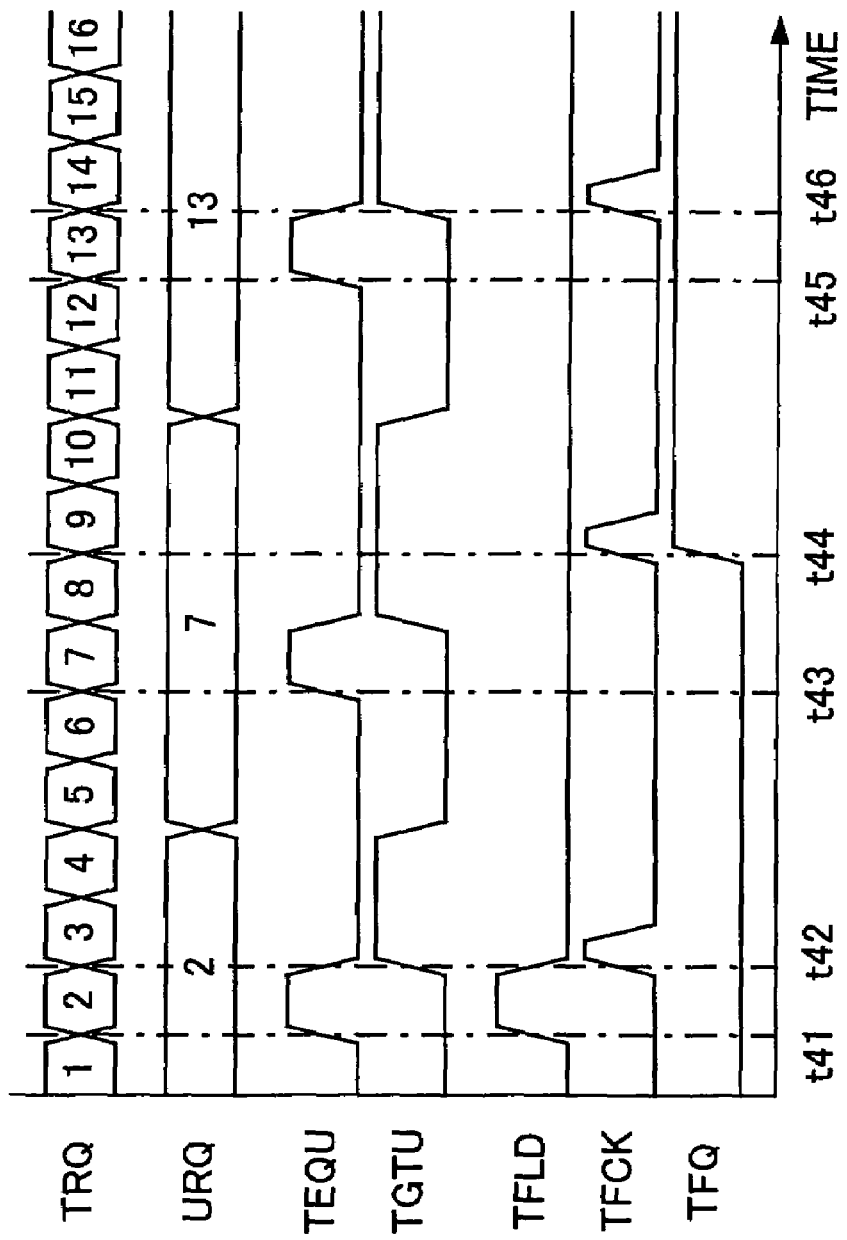
FIG. 24 is a timing chart representing an operation timing corresponding to the case where instruction processing unit 10a of the second embodiment executes the program of FIG. 23.

FIG. 23 shows another example of a program using the additional instructions of FIG. 18. This program is directed to detect scheduling violation using WAIT3 instruction and T flag indicated in FIG. 18. T flag is set when TGTU signal is at an H level at the completion of execution of WAIT3 instruction, i.e. when scheduling violation occurs. Once T flag is set, T flag will not be cleared even if TGTU signal is at an L level and TEQU signal is at an H level at the completion of execution of the next WAIT3 instruction, i.e., even in a scheduling establishment status. This differs from WAIT2 instruction. FIG. 24 is a timing chart representing an operation timing corresponding to the case where instruction processing unit 10a executes the program of FIG. 23.

First, specified time "2" is set in time register 12 (line 1). Following the suppression of execution until the specified time, T flag is updated (line 2). Completion of instruction execution is delayed until the timing of t41 shown in FIG. 24. T flag is set at the timing of t42. At t42, T flag is cleared since the status of scheduling establishment is attained (L level of TGTU signal).

Then, specified time "7" is set in time register 12 (line 3). The process proceeds to subroutine "subroutine" where the execution time is indefinite (line 4). When the process returns from subroutine "subroutine", execution is suppressed until the specified time, and then T flag is updated (line 5). It is assumed that WAIT3 instruction is executed later than specified time "7" (timing of t43 of FIG. 24) since execution of subroutine "subroutine" was unexpectantly time consuming. At this current stage, scheduling violation has occurred (timing of t44 in FIG. 24), and TFQ signal output from TF register 22 attains an H level.

Next, specified time "13" is set in time register 12 (line 6). Execution until the specified time is suppressed (timing of t44 in FIG. 24), and then T flag is updated (line 7). At this current stage, TGTU signal is at an L level and TEQU signal is at an H level, i.e., a scheduling establishment status. However, the set status of T flag is maintained as indicated by the timing of t46 in FIG. 24.

Then, determination is made whether there is scheduling violation or not (line 8). Since T flag is set, branching to label OK is not taken. The process proceeds to recovery procedure subroutine "recover" (line 9). By producing a program using WAIT3 instruction, detection of scheduling violation and recovery can be carried out. In comparison to the above-described WAIT2 instruction, detection can be made of where a scheduling violation has occurred by checking one site by the program using WAIT3 instruction.

According to the real-time processor of the present embodiment, the time when execution time register 21 has executed a time dependent instruction is stored. Therefore, the delay of the execution time of the time dependent instruction from the specified time can be identified when scheduling violation occurs to facilitate the recovery procedure of scheduling violation.

Since TF register 22 stores the event of scheduling violation, the presence of scheduling violation can be easily identified by the program that will be executed subsequently. Also, the program process flow can be controlled when scheduling violation has occurred since instruction processing unit 10a will execute an instruction that carries out branching depending upon the value of TF register 22.

Third Embodiment

Figure 25:
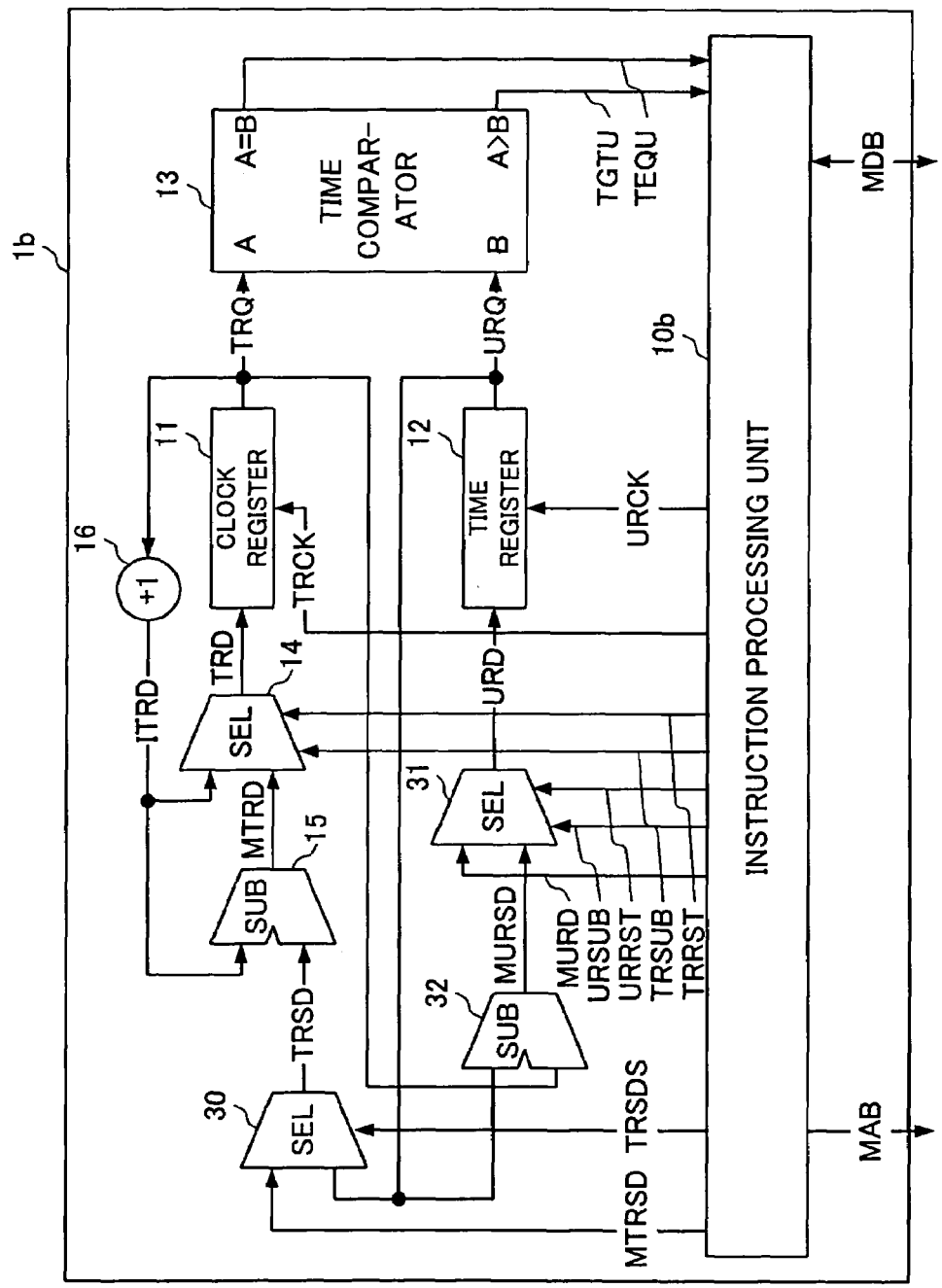
FIG. 25 is a block diagram showing a schematic structure of a real-time processor according to a third embodiment of the present invention.

FIG. 25 is a block diagram showing a schematic structure of a real-time processor according to a third embodiment of the present invention. The real-time processor of the third embodiment differs from the real-time processor of the first embodiment shown in FIG. 9 in that a selector 30 selecting a value to be input to subtracter 15, a selector 31 selecting a value to be input to time register 12, and a subtracter 32 subtracting the value in clock register 11 from the value stored in time register 12 are additionally provided with the feature in the instruction processing unit to control these additional circuits. Therefore, detailed description of corresponding components and features will not be repeated. In the third embodiment, the real-time processor is designated 1b, and the instruction processing unit is designated 10b.

Selector 30 has one input terminal connected to MTRSD signal, the other input terminal connected to URQ signal, the select signal input terminal connected to TRSDS, and the output terminal connected to TRSD signal. When TRSDS signal is at an L level, the value of MTRSD is output as TRSD signal. When TRSDS signal is at an H level, the value of URQ is output as TRSD signal.

Selector 31 has one input terminal connected to MURD signal, the other input terminal connected to MURSD signal, the one select signal input terminal connected to URRST signal, the other select signal input terminal connected to URSUB signal, and the output terminal connected to URD signal. When URRST signal attains an H level, 0 is output to URD signal regardless of other input signals. When URRST signal and URSUB signal are at an L level, the value of MURD is output as URD signal. When URRST signal is at an L level and URSUB signal is at an H level, the value of MURSD is output as URD signal.

Subtracter 32 has one input terminal connected to URQ signal, the other input terminal connected to TRQ signal, and the output terminal connected to MURSD signal. Subtracter 32 subtracts the value of TRQ from the value of URQ to output the result as MURSD signal.

FIG. 26 shows a list of instructions added to the real-time processor of the present embodiment. Instructions NORM1, NORM2 and NORM3 are directed to correct the time. The operation of respective instructions is described in FIG. 26. Therefore, detailed description thereof will not be described here.

Figure 28:
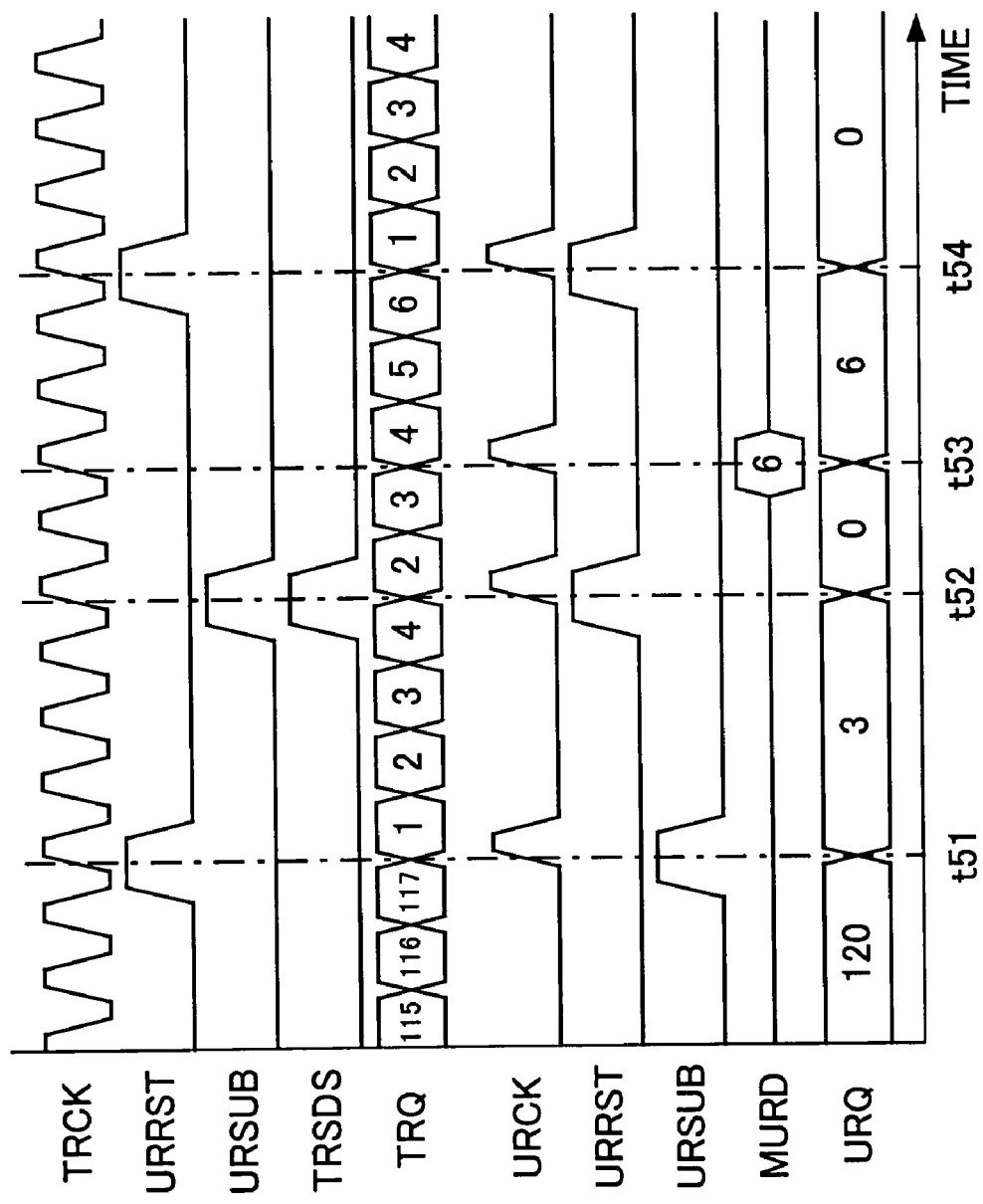
FIG. 28 is a timing chart representing an operation timing corresponding to the case where instruction processing unit 10b of the third embodiment executes the program of FIG. 27.

FIG. 27 shows an example of a program using the additional instructions of FIG. 26. This program that corrects the time using instructions NORM1, NORM2 and NORM3 serve to define respective instructions, and are not directed to an operation of a particular meaning. FIG. 28 is a timing chart representing an operation timing corresponding to the case where instruction processing unit 10b executes the program of FIG. 27.

The time is corrected by NORM2 instruction (line 1). NORM2 instruction is a time correction instruction that can be used when the value of time register 12 is greater than the value of clock register 11, i.e., when in a scheduling standby status. Therefore, it is desirable that NORM2 instruction is used after completion of the time dependent instruction execution associated with execution delay of an instruction such as WAIT instruction, and further after update of the value in time register 12.

As shown by timing t51 of FIG. 28, value TRQ of clock register 11 is subtracted from value URQ in time register 12 when NORM2 instruction is executed, and value "1" is set in clock register 11. Thus, correction is effected to reduce the absolute value in each register while maintaining the difference between the value of time register 12 and the value of clock register 11 constant.

Prior to execution of NORM2 instruction, the result of subtracting the value of clock register 11 from the value of time register 12 is 3 (=120–117). After execution of NORM2 instruction, the subtracted value is 2 (=3–1). Since there is one rising edge of TRCK signal between the correction of each register, the difference between the value of time register 11 and the value of time register 11 is maintained taking into consideration of the value of clock register 11 being incremented.

Then, the process proceeds to subroutine "subroutine" (line 2). When the process returns from subroutine "subroutine", the time is corrected by NORM1 instruction (line 3). NORM1 instruction is a time correction instruction that can be used when the value of clock register 11 is greater than the value of time register 12, i.e. when in a scheduling violation state. Therefore, it is desirable that NORM1 instruction is used after completion of the time dependent instruction execution associated with execution delay of an instruction such as WAIT instruction.

Referring to timing t52 of FIG. 28, value URQ of time register 12 is subtracted from value TRQ of clock register 11 when NORM1 instruction is executed, and value "0" is set in time register 12. Thus, correction is made so that the absolute value of the value in each register is reduced while maintaining the difference between the value in clock register 11 and the value in time register 12 constant.

Prior to execution of NORM1 instruction, the result of subtracting the value of time register 12 from the value of clock register 11 is 1 (=4–3). After execution of NORM1 instruction, the subtracted value is 2 (=2–0). Since there is one rising edge of TRCK signal between correction of each registers, the difference between the value of clock register 11 and the value of time register 12 is maintained taking into consideration increment of the value of clock register 11.

Then, specified time "6" is set in time register 12 (line 4). The process proceeds to subroutine "subroutine" where the execution time is indefinite (line 5). When the process returns from subroutine "subroutine", the time is corrected by NORM3 instruction (line 6). NORM3 instruction is a time correction instruction that can be used irrespective of the relationship between the value in clock register 11 and the value in time register 12. Therefore, NORM3 instruction can be used instead of NORM2 instruction (line 1) or NORM1 instruction (line 3).

Referring to timing t54 in FIG. 28, 1 is set in clock register 11 and 0 is set in time register 12 since the value of clock register 11 is equal to the value in time register 12. Thus, correction is made so that the absolute value of the value in each register is reduced while maintaining the difference between the value in clock register 11 and the value in time register 12 constant. As shown in FIG. 26, NORM3 instruction carries out an operation identical to that of NORM1 instruction and NORM2 instruction when in a scheduling violation state and a scheduling standby state, respectively.

Prior to execution of NORM3 instruction, the result of subtracting the value of time register 12 from the value in clock register 11 is 0 (=6–6). After execution of NORM3 instruction, the subtracted value is 1 (=1–0). Since there is one rising edge of TRCK signal between correction of each register, the difference between the value in clock register 11 and the value in time register 12 is maintained taking into consideration increment of the value of clock register 11.

According to the real-time processor of the present embodiment, instruction processing unit 10b interprets and executes the time correction instruction. Therefore, overflow of clock register 11 can be easily prevented. Since correction of clock register 11 and correction of time register 12 are carried out at the same time, the period where the magnitude relationship between the values of clock register 11 and time register 12 is not correct can be eliminated.

Fourth Embodiment

Figure 29:
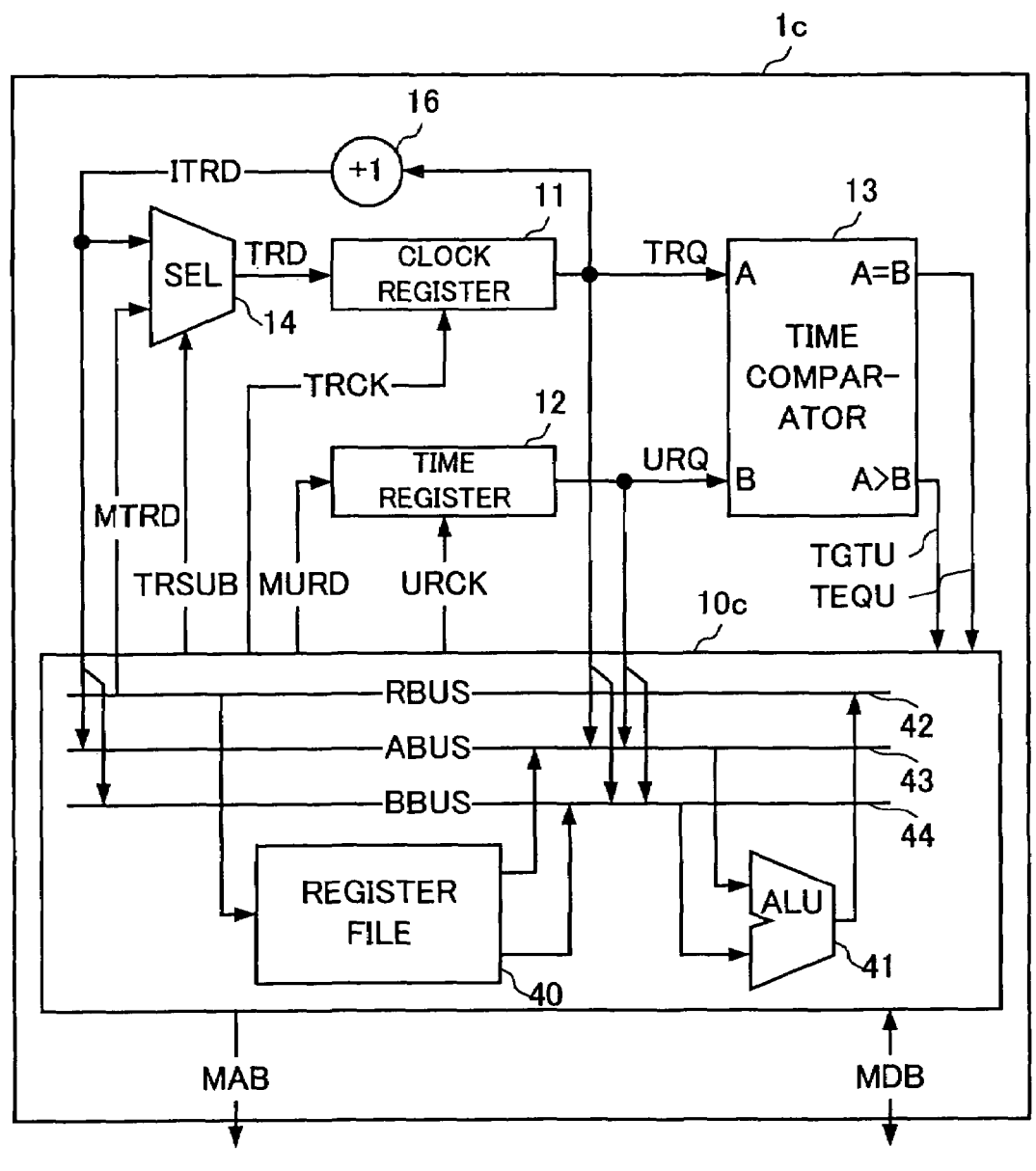
FIG. 29 is a block diagram showing a schematic structure of a real-time processor according to a fourth embodiment of the present invention.

FIG. 29 is a block diagram showing a schematic structure of a real-time processor according to a fourth embodiment of the present invention. The previous real-time processor of the third embodiment has two subtracters 15 and 32 prepared as shown in FIG. 25. Also, instruction processing unit 10b includes an ALU (Arithmetic and Logical Unit) not shown with a subtraction feature to execute an arithmetic instruction. This means that three subtracter circuits are provided.

In executing the time correction instruction of FIG. 26, it is apparent from the operation thereof that two subtracters will not be operated simultaneously. When instruction processing unit 10b is not super scalar, i.e. a structure that cannot execute a plurality of instructions simultaneously, an arithmetic instruction will not be executed simultaneous to the time correction instruction. This means that only one of the three subtracter circuits at most will be used. Therefore, the three subtraction circuits can be reduced to one.

The real-time processor of the present embodiment is a reconstruction of the real-time processor of the third embodiment shown in FIG. 25. The real-time processor of the fourth embodiment differs from the real-time processor of the third embodiment of FIG. 25 in that subtracters 15 and 32 and selector 30 are deleted with internal buses 42, 43, 44 and an ALU 41 in the instruction processing unit including that feature. Detailed description of corresponding components and features will not be repeated. In the fourth embodiment, the real-time processor is designated 1c and the instruction processing unit is designated 10c.

Register file 40 has the input port connected to a RBUS42, one output port connected to ABUS43 and the other output port connected to BBUS44. ALU 41 has one input port connected to ABUS43, the other input port connected to BBUS44, and the output port connected to RBUS42. Instruction processing unit 10c causes ALU 41 to carry out its operation according to the value in register file 40. The result is written in register file 40 to carry out execution of an instruction. ALU 41 has the facility to carry out various logical operations and arithmetic operations, the subtraction feature being one thereof.

MTRD signal connected to one input terminal of selector 14, and MURD signal connected to the data input terminal of time register 12 are connected to RBUS42 in addition to the input port of register file 40 and the output port of ALU 41. Therefore, the operation result of ALU 41 can be set in clock register 11 or time register 12.

TRQ signal connected to the output terminal of clock register 11, URQ signal connected to the output terminal of time register 12, and ITRD signal connected to the output terminal of incrementer 16 are connected to ABUS43 and BBUS44, in addition to the output port of register file 40 and the input port of ALU41. Therefore, the value in clock register 11 or time register 12 can be used as the operation input to ALU41. Thus, ALU41 in instruction processing unit 10c can carry out the required functional process for time correction.

As a shown in FIG. 29, ALU41 can carry out the process according to an arbitrary combination of the values of a general-purpose register (register file 40), clock register 11 and time register 12. The processed result can be written to any of the general-purpose register, clock register 11 and time register 12.

An example of additional instructions that can be realized by the real-time processor of the present embodiment is shown in FIG. 30. Transfer and processing between clock register 11 or time register 12 and the general-purpose resisters are allowed. The operation of respective instructions are defined in FIG. 30. Therefore, detailed description thereof will not be repeated.

Figure 31:
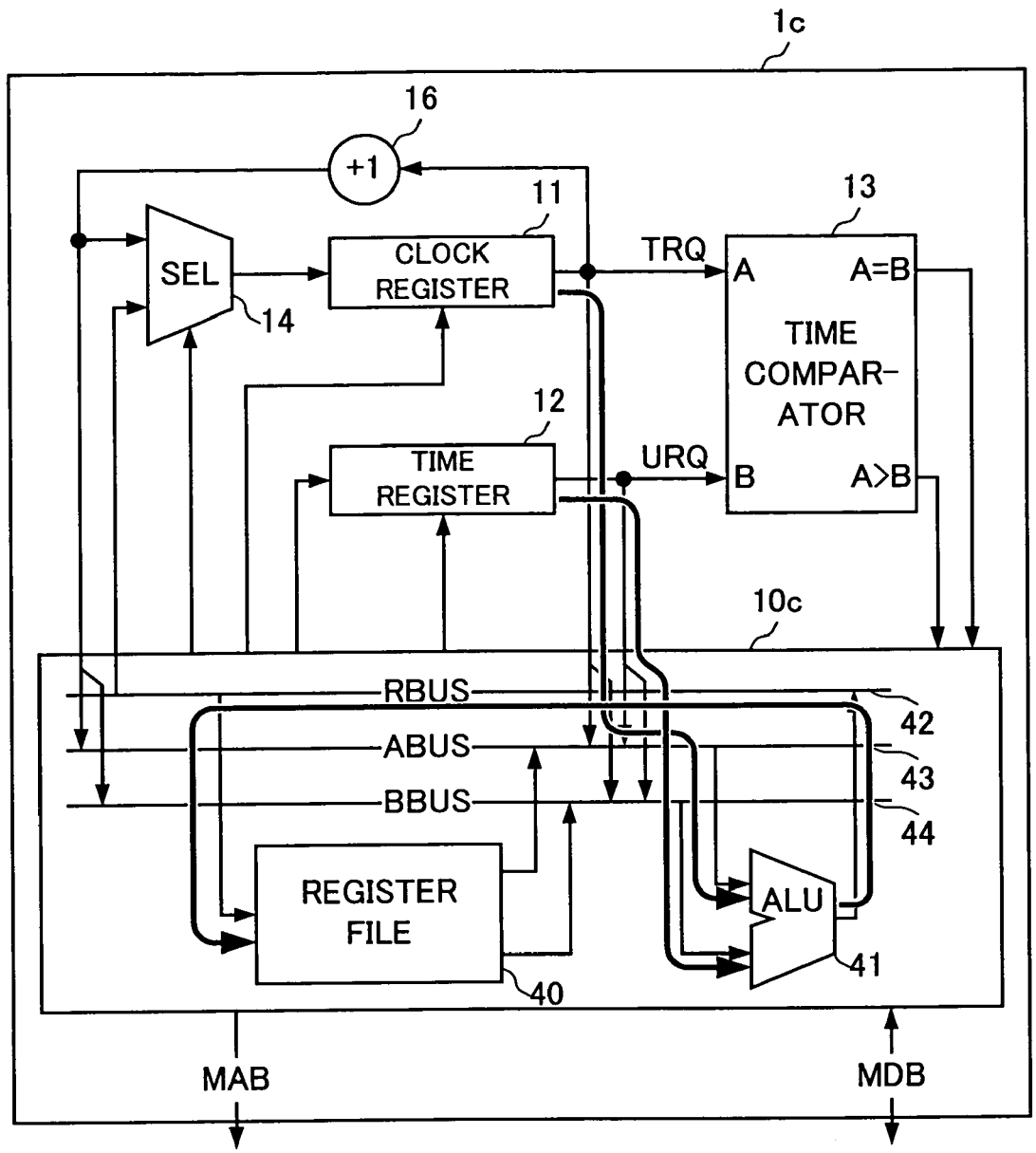
FIG. 31 shows the data flow when the additional instructions of FIG. 30 are executed.

FIG. 31 shows the data flow corresponding to the case where the additional instructions "SUB Rd, ETR, EUR" of the present embodiment are executed. TRQ signal from clock register 11 and URQ signal from time register 12 are applied to ALU41 via ABUS43 and BBUS44, respectively. ALU41 subtracts value URQ of time register 12 from value TRQ of clock register 11 and provides the result to RBUS42. Register file 40 receives the result via RBUS42 and stores the same in register Rd.

According to the real-time processor of the present embodiment, ALU41 in instruction processing unit 10c carries out a functional process according to an arbitrary combination of the values in the general purpose register, clock register 11 and time register 12. Therefore, the number of subtracters can be reduced to lower the cost of the processor. Since the processed result can be written into any of the general-purpose register, clock register 11 and time register 12, flexibility of the instruction set architecture of the instruction processing unit can be increased. An instruction set architecture of high directivity can be realized by handling clock register 11 and time register 12 as general-purpose registers. As a result, the constraint in programming is alleviated to facilitate program creation. The structure of the instruction decoder in instruction processing unit 10c can be simplified to allow reduction in cost.

Fifth Embodiment

Figure 32:
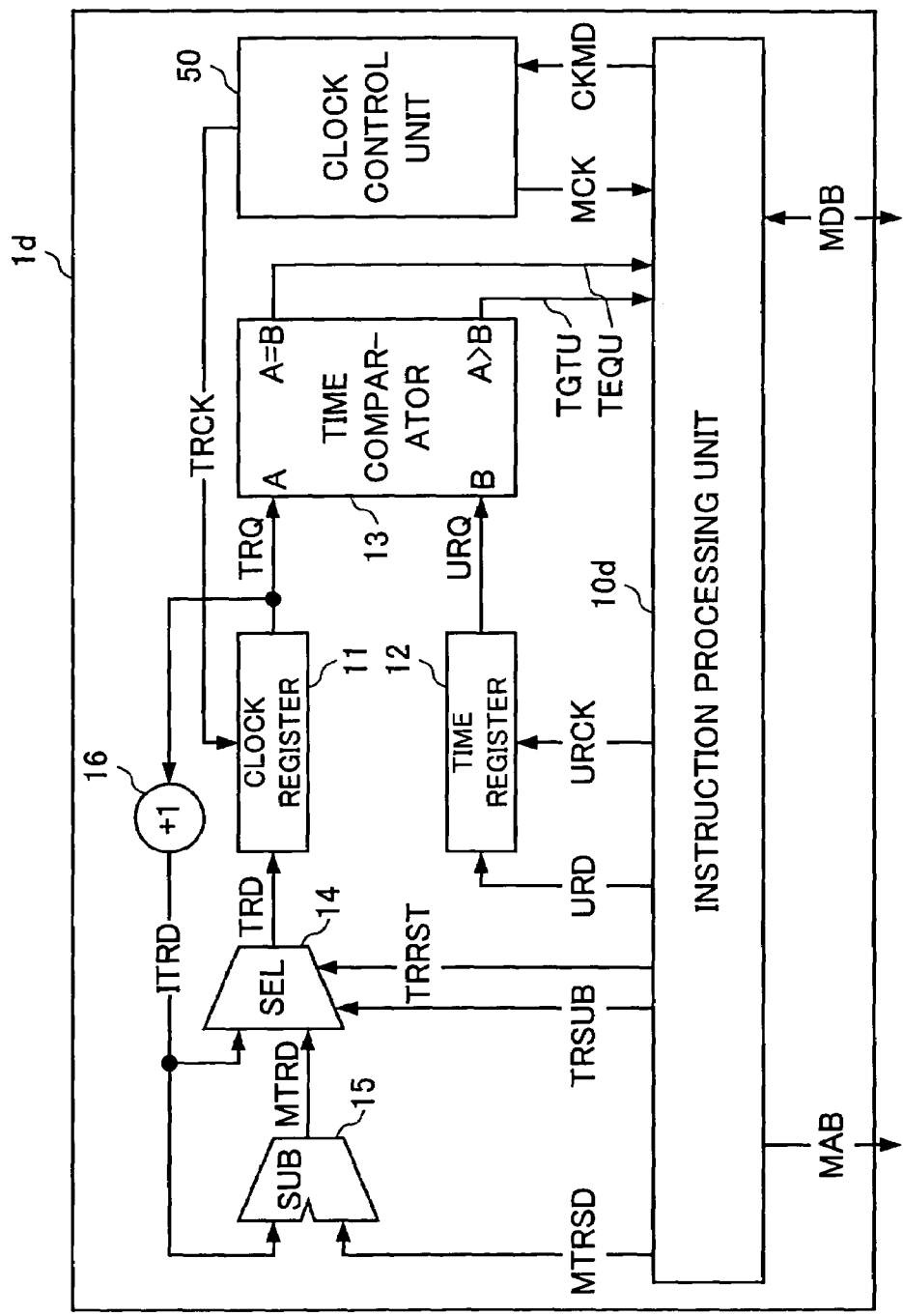
FIG. 32 is a block diagram showing a schematic structure of a real-time processor according to a fifth embodiment of the present invention.

FIG. 32 is a block diagram showing a schematic structure of a real-time processor according to a fifth embodiment of the present invention. The real-time processor of the present embodiment differs from the real-time processor of the first embodiment shown in FIG. 9 in that a clock controller 50 is added. Therefore, detailed description of corresponding components and feature will not be repeated. In the fifth embodiment, the real-time processor is designated 1d and the instruction processing unit is designated 10d.

Clock controller 50 has the clock mode select input terminal connected to CKMD signal, the clock output terminal connected to MCK signal, and the timer clock output terminal connected to TRCK signal.

Instruction processing unit 10d is provided with an input terminal connected to MCK signal and an output terminal connected to CKMD signal. CKMD signal is output to clock controller 50 to control the same. The value output to CKMD signal by instruction processing unit 10d is used to modify the instruction execution speed of instruction processing unit 10d. Controller 50 responds to the value of CKMD to suppress the output of MCK signal, to output MCK signal at the standard frequency, to output MCK signal at a frequency lower than the standard frequency, and to output MCK signal at a frequency higher than the standard frequency when the value of CKMD is 0, 1, 2, and 3, respectively.

Figure 33:
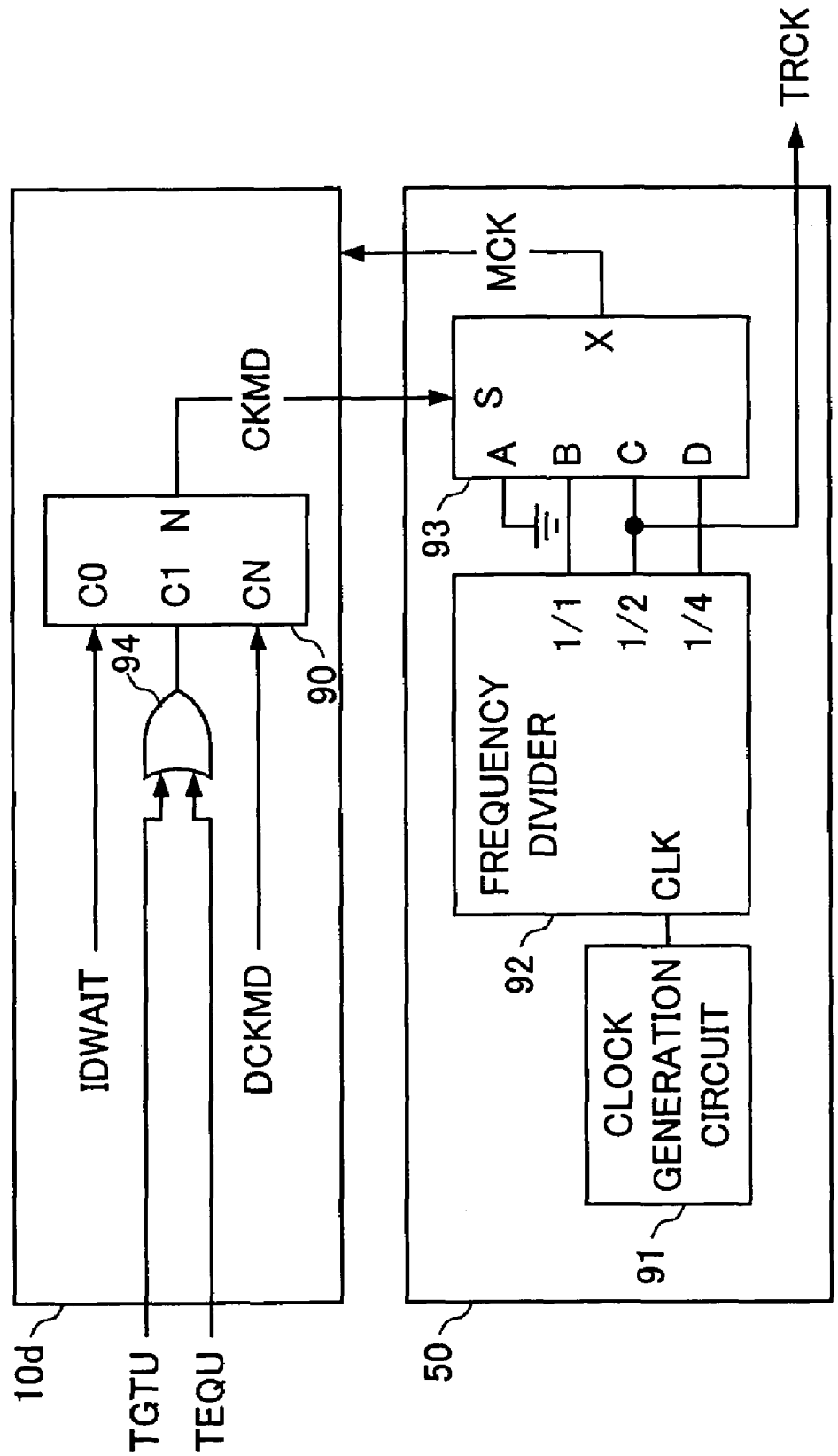
FIG. 33 is a block diagram showing a schematic structure of an instruction processing unit 10d and a clock control unit 50 of the fifth embodiment.

FIG. 33 is a block diagram showing a schematic structure of instruction processing unit 10d and clock controller 50 of the present embodiment. Instruction processing unit 10d includes a combination circuit 90 and an OR circuit 94. Clock controller 50 includes a clock generation circuit 91, a frequency divider 92, and a combination circuit 93.

Combination circuit 90 provides the value of DCKMD to CKMD signal when input values C0 and C1 both attain an L level, i.e. when signals IDWAIT, TEQU and TGTU are all at an L level, as shown in FIG. 34. DCKMD signal has its value set by the program to specify the processing speed of instruction processing unit 10d when in a scheduling standby status and when the instruction that delays instruction execution such as a WAIT instruction is absent in the instruction decode stage. When input value C1 is at an H level, i.e. when either TEQU signal or TGTU signal is at an H level, 1 is output irrespective of IDWAIT signal. When input value C0 is at an H level and C1 is at an L level, i.e., when TEQU signal and TGTU signal are both at an L level, and IDWAIT is at an H level, 0 is output.

Clock generation circuit 91 generates a clock according to an oscillator or an externally supplied clock. Frequency divider 92 frequency-divides the clock signal output from clock generation circuit 91 to output a clock of 1/1, 1/2 and 1/4. Combination circuit 93 responds to CKMD signal from instruction processing unit 10d to output an L level, to output a clock of 1/2, to output clock of 1/4, and to output clock of 1/1 when CKMD signal is 0, 1, 2, and 3, respectively, as shown in FIG. 35.

When TEQU signal and TGTU signal are both at an L level, i.e. when an instruction that delays instruction execution such as a wait instruction arrives at the instruction decode stage in a scheduling standby state, combination circuit 90 outputs 0 to CKMD signal and combination circuit 93 outputs an L level to MCK signal. As a result, clock supply to instruction processing unit 10d is suppressed to delay execution of an instruction.

When TEQU signal or TGTU signal is at an H level, i.e. when in a scheduling establishment status or scheduling violation status, combination circuit 90 outputs 1 to CKMD signal and combination circuit 93 outputs a clock of 1/2 (standard clock) to MCK signal. As a result, instruction processing unit 10d carries out program execution at the standard instruction execution speed.

When TEQU signal and TGTU signal are both at an L level, i.e. when in a scheduling state and the instruction that delays instruction execution such as a WAIT instruction is absent in the instruction decode stage, combination circuit 90 provides the value of DSKMD to CKMD signal and combination circuit 93 outputs a clock of the set frequency. As a result, instruction processing unit 10d carries out a program execution at the set instruction execution speed.

Figure 36:
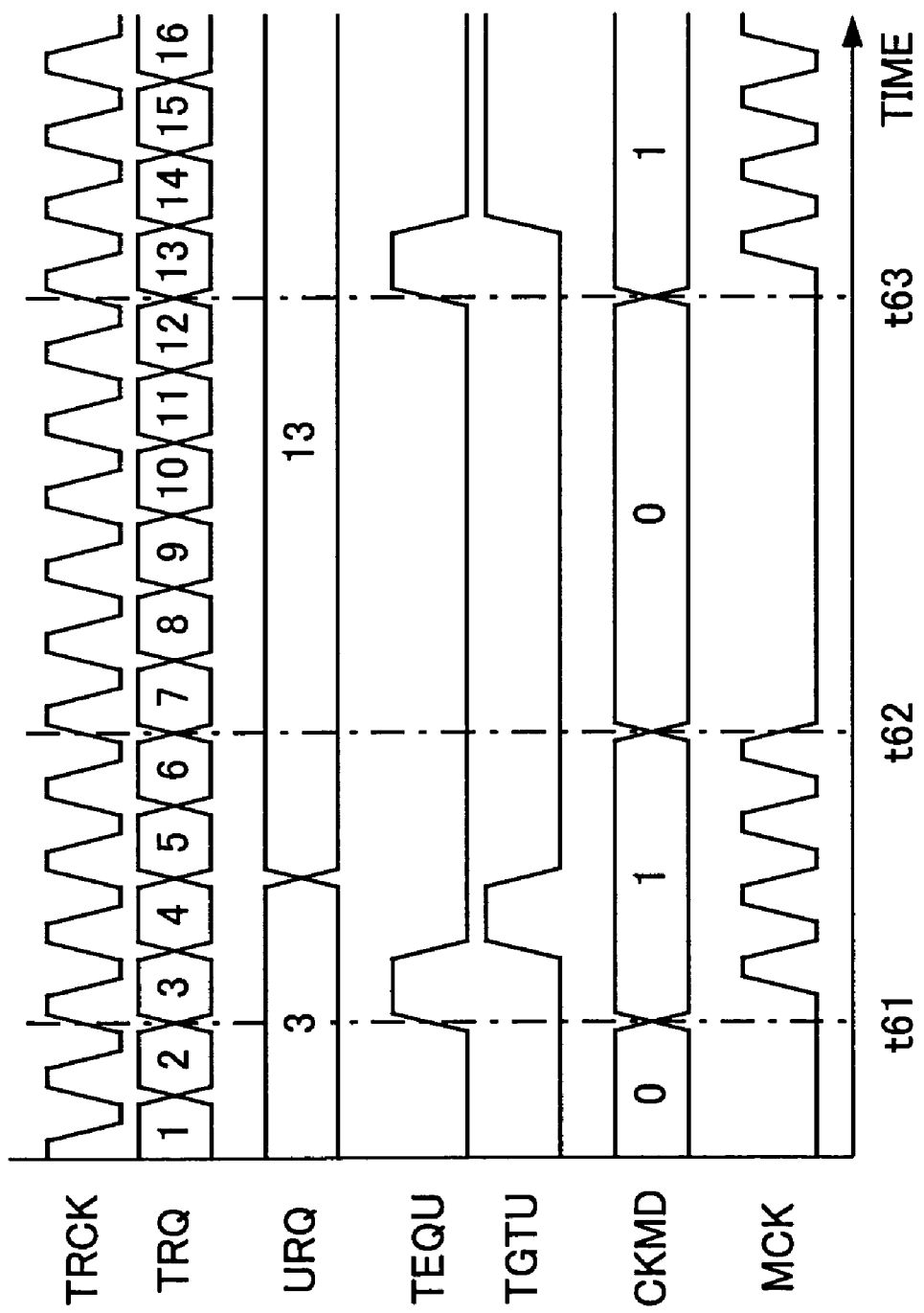
FIGS. 36, 37 and 38 are examples of timing charts to describe clock control by clock control unit 50.

FIG. 36 shows an example of a timing chart of clock control by clock controller 50. Clock controller 50 has clock output suppressed until timing t61. Clock supply is resumed when TEQU signal attains an H level simultaneous to scheduling establishment and the value of CKMD becomes 1. It is to be noted that the value of DCKMD is set to 1.

When instruction processing unit 10d completes the series of processes, and WAIT instruction is executed at timing t62, IDWAIT signal becomes 1, so that value "0" is output to CKMD. As a result, clock supply is suppressed again. When scheduling is established at timing t63, clock controller 50 resumes clock supply to instruction processing unit 10d.

It is not necessary to supply a clock since instruction processing unit 10d is suppressed in operation until scheduling is established when an instruction that has execution temporarily delayed such as WAIT instruction is executed. Therefore, the clock towards instruction processing unit 10d can be stalled to reduce power consumption. Although instruction processing unit 10d alone is under control of clock supply according to the structure of real-time processor 1d of FIG. 33, the clock supplied to input/output device 3 which is a component of the system shown in FIG. 8 can also be controlled.

Figure 37:
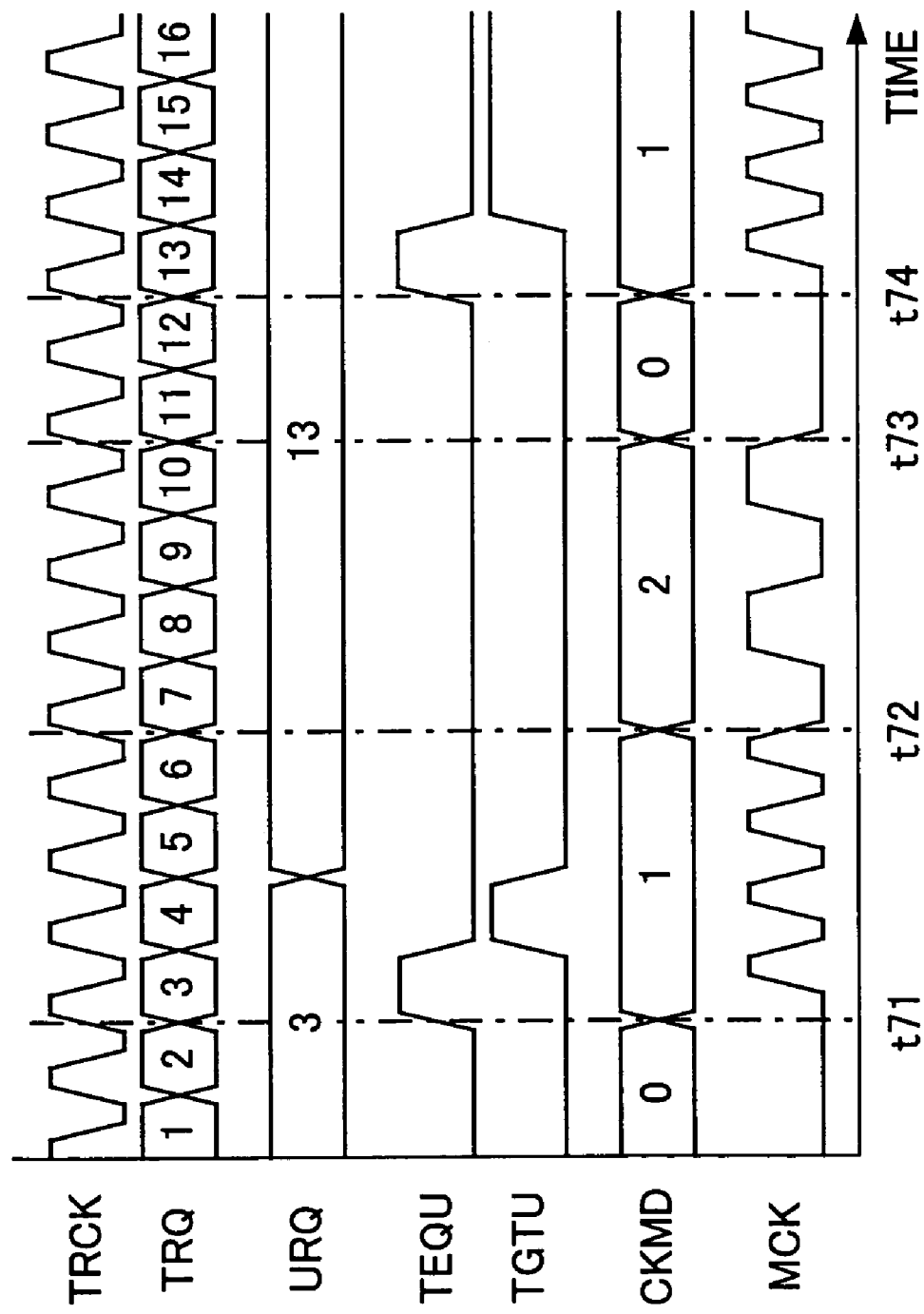

FIG. 37 is another example of a timing chart representing clock control by clock controller 50. Clock controller 50 has clock output suppressed until timing t71. Clock supply is resumed when TEQU signal attains an H level simultaneous to scheduling establishment and the value of CKMD becomes 1. It is assumed that the value of DCKMD is set to 1. Since the standard frequency clock (1/2 clock) is output to clock MCK during the period of t71:72, the execution timing of respective instructions can be easily estimated. This mode is suitable when a program depending upon the execution speed is executed.

When execution of the program portion depending upon the instruction execution speed ends at timing t72, time register 12 is updated by the program and 2 is set at DCKMD, whereby a clock of a frequency lower than the standard frequency is output (1/4 clock). As a result, instruction processing unit 10d carries out a process at a low execution speed. Power consumption of instruction processing unit 10d can be reduced by setting the clock frequency lower than the standard frequency. By modifying the power supply voltage towards instruction processing unit 10d at the same time, power consumption can be further reduced.

At time t73, clock supply is suppressed again when WAIT instruction is executed. Subsequently, 1 is output at CKMD to resume clock supply when scheduling is established at timing t74. Although 2 is set at CKMD signal in the period of t72:73, "3" may be set to supply a clock of higher frequency.

Figure 38:
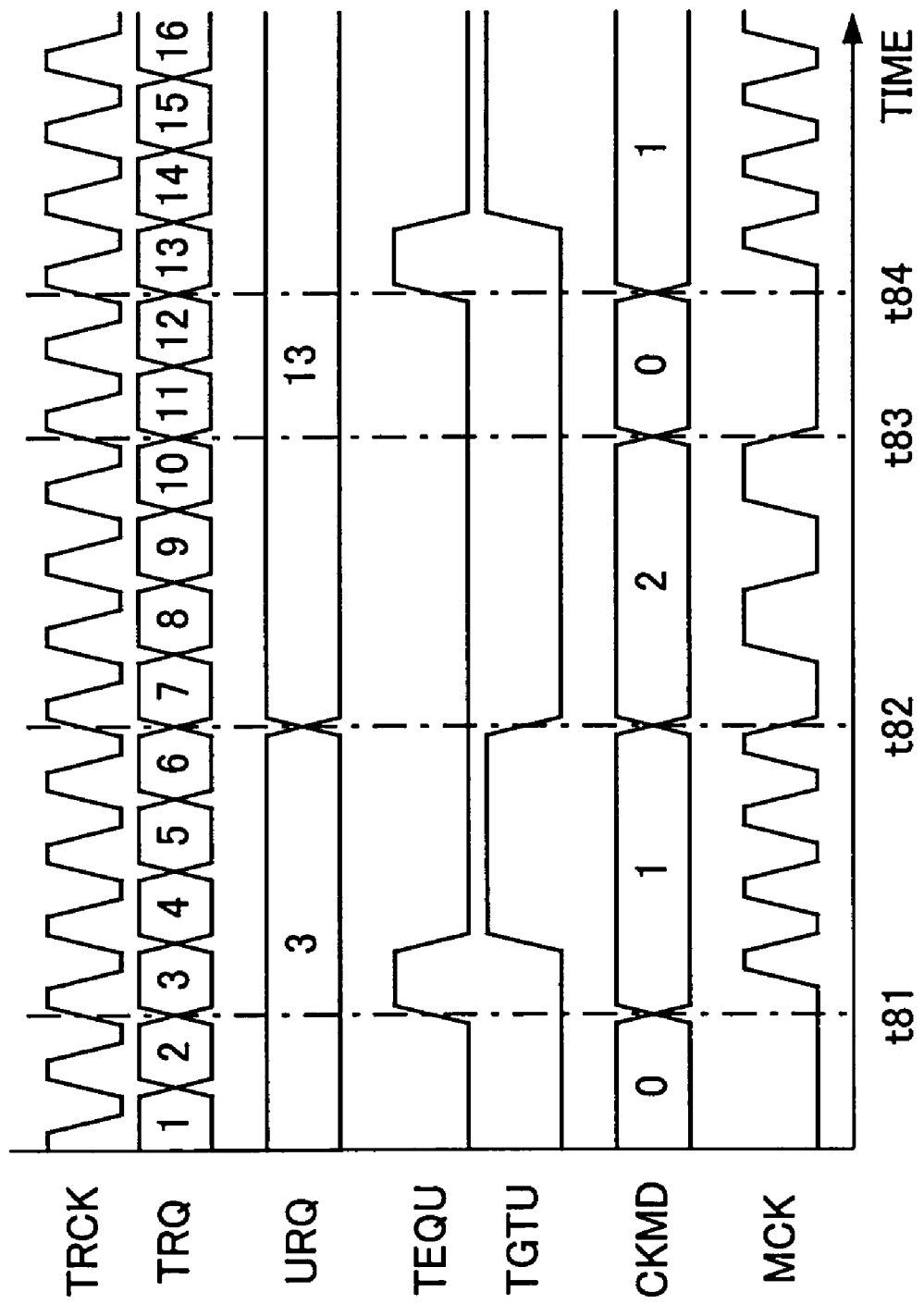

FIG. 38 is another example of a timing chart representing clock control by clock controller 50. Clock controller 50 has clock output suppressed until timing t81. Clock supply is resumed when TEQU signal attains an H level simultaneous to scheduling establishment and the value of CKMD becomes 1. Following the drive of TEQU signal to an H level, scheduling violation occurs, whereby TGTU signal attains an H level. Since 1 is output to CKMD signal irrespective of the value of DCKMD signal until timing t82 where TGTU signal maintains the H level state, a clock of the standard frequency is output. It is assumed that the value of DCKMD is set to 2.

When TGTU signal attains an L level by the reset of the signal in time register 12 at timing t82, value "2" of DCKMD is output to CKMD signal, whereby a clock of a frequency lower than the standard frequency is output. As a result, instruction processing unit 10d carries out the process at a low execution speed. Since the value of DCKMD set by the program is maintained, it is no longer necessary to modify the value of DCKMD through the program.

At timing t83, clock supply is suppressed again when WAIT instruction is executed. Then, when scheduling is established at timing t84, 1 is output to CKMD signal to resume clock supply.

In the timing charts of FIGS. 36–38, clock supply is resumed immediately after timing t61, t71 and t81. Control is provided so that the clock rises at an elapse of a constant time from the rise of TEQU signal. Instruction processing unit 10d can interpret and execute an instruction in synchronization with the update of clock register 11 even in a circuit implementation in which the update cycle of clock register 11 and the operating cycle of instruction processing unit 10d are independent.

In the real-time processor of the present embodiment shown in FIG. 32, instruction processing unit 10d is configured by a synchronization circuit that has the operation defined by clock MCK. However, the instruction processing unit can be configured by an asynchronous circuit. In the case the instruction processing unit is configured by an asynchronous circuit, the operating speed between asynchronous circuits can be controlled by delaying the data handshake signal between the asynchronous circuits. Thus, the instruction execution timing can be controlled correctly even in the case the instruction processing unit is configured of an asynchronous synchronization circuit whose instruction execution timing is difficult to estimate.

In the real-time processor of the present embodiment shown in FIG. 32, the operating speed of the instruction processing unit is controlled by controlling the clock frequency. If the instruction processing unit is of the type that carries out super scalar processing, the super scalar operation is suppressed during the period the process is carried out at the standard instruction execution speed to interpret and execute the instruction by serial processing, not parallel processing. Accordingly, variation in the instruction execution speed caused by various hazards is eliminated to facilitate estimation of the instruction execution timing.

Some recent processors are incorporated with a branch prediction mechanism, an address conversion mechanism, or an element that alters the instruction execution speed of a cache memory and the like in addition to the super scalar mechanism. It is therefore effective to temporarily suppress the operation of these mechanisms to obtain a standard instruction execution speed.

According to the real-time processor of the present embodiment, clock controller 50 controls the clock frequency to allow adjustment of the instruction execution speed of instruction processing unit 10d. Therefore, selection of executing the program at high speed to reduce the execution time or executing the program at low speed to reduce power consumption, for example, can be made. In the case where instruction processing unit 10d delays instruction execution, clock supply to instruction processing unit 10d is suppressed by clock controller 50, so that power consumption can be further reduced.

Sixth Embodiment

Figure 39:
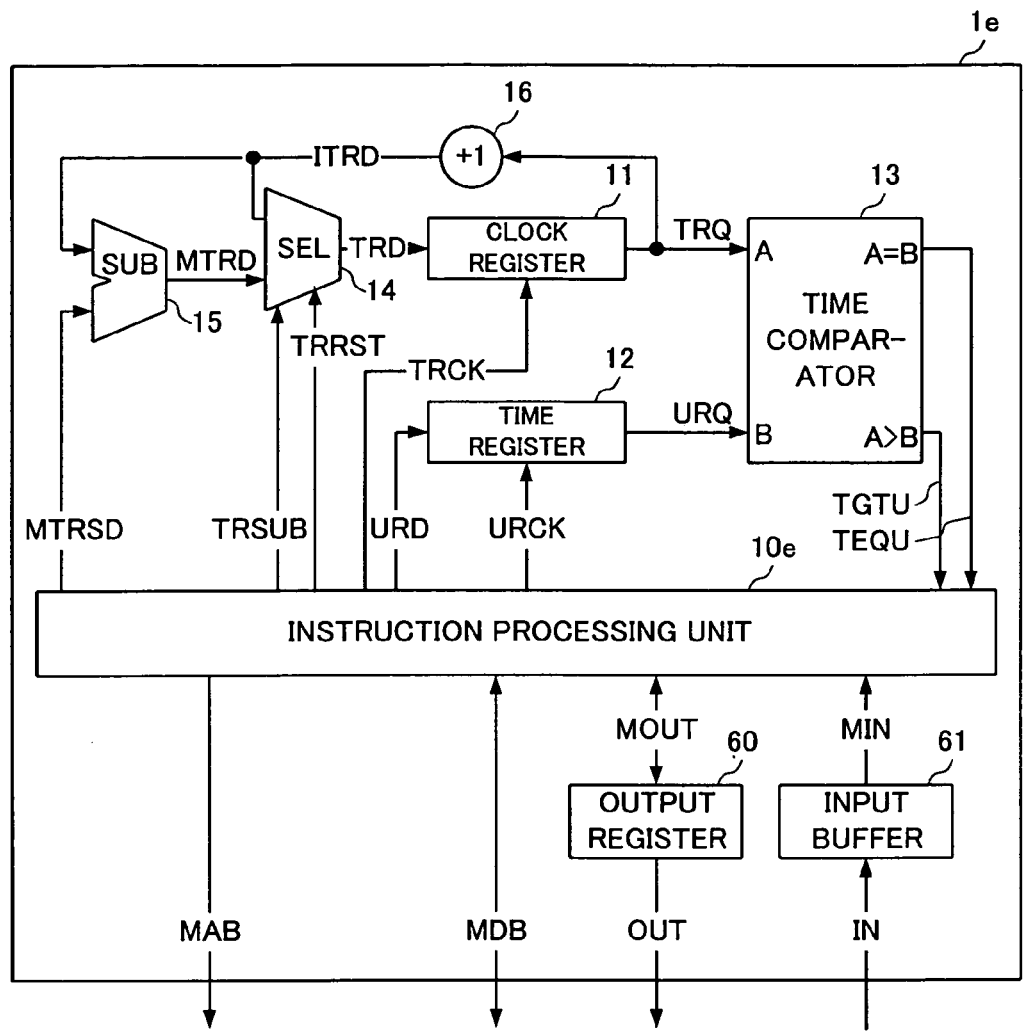
FIG. 39 is a block diagram showing a schematic structure of a real-time processor according to a sixth embodiment of the present invention.

FIG. 39 is a block diagram showing a schematic structure of a real-time processor according to a sixth embodiment of the present invention. The real-time processor of the present embodiment differs from the real-time processor of the first embodiment shown in FIG. 9 in that an output register 60 and an input buffer 61 are additionally provided. Detailed description of corresponding structures and features will not be repeated. In the present sixth embodiment, the real-time processor is designated 1e and the instruction processing unit is designated 10e.

Output register 60 has the instruction processing unit side input/output terminal connected to MOUT signal and the external side output terminal connected to OUT signal. MOUT signal is a bidirectional signal used when instruction processing unit 10e writes a value into output register 60 or when the value set in output register 60 is read out. By this structure, a process of selecting one particular bit out from OUT signal for inversion is allowed.

Input buffer 61 has the output terminal connected to MIN signal and the input terminal connected to IN signal. MIN signal serves to read out the value in input buffer 61. IN signal is connected to input/output device 3.

FIG. 40 shows a list of additional instructions added to instruction processing unit 10e of the present embodiment. INR and OUTR designate input buffer 61 and output register 60, respectively. The value of input buffer 61 or output register 60 can be referred to without using a memory reference instruction or I/O reference instruction.

Generally, the execution timing of a memory reference instruction or I/O reference instruction depends upon the usage of MAB and MDB connected to instruction processing unit 10e. For example, instruction processing unit 10e has execution delayed until usage of an external bus is obtained during a DMA (Direct Memory Access) process where input/output device 3 directly accesses the memory device via an external bus such as MAB and MDB. This induces the case where instruction processing unit 10e cannot perform a predetermined operation at a predetermined time. Usage of the above-described instruction allows reference of the value of input buffer 61 or output register 60 without the usage of an external bus, so that delay caused by an external factor can be prevented. A predetermined operation can be carried out correctly at a predetermined time.

According to the real-time processor of the present embodiment, provision of an output register 60 and an input buffer 61 allows delay caused by an external factor to be prevented, such that a predetermined input/output operation can be carried out correctly at a predetermined time.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A real-time processor comprising:
   a clock register updating a time at a predetermined interval;
   a time register storing an arbitrary time point as a time when execution of an instruction is to be completed;
   a time comparator comparing the time of said clock register and the arbitrary time point stored in said time register; and
   an instruction processing unit executing the instruction, whose execution status is altered according to a comparison result of said time comparator, where said arbitrary time point is set by said instruction processing unit and independent of the time in said clock register, wherein said time comparator detects that the time of said clock register matches the time stored in said time register, and detects that the time in said clock register is greater than the time stored in said time register, and
   said instruction processing unit executes a time dependent instruction, for the associated instruction having altered status, that delays completion of execution of the instruction having altered status until said time comparator detects that the time in said clock register matches or that the time in said clock register is greater than the time point stored in said time register.

2. The real-time processor according to claim 1, further comprising a subtracter subtracting a predetermined value from the time in said clock register and setting the result in said clock register, wherein said instruction processing unit subtracts said predetermined value from the time stored in said time register to set the result in said time register.

3. The real-time processor according to claim 1, wherein said instruction processing unit executes a time dependent instruction whose branching is altered depending upon the comparison result of said time comparator.

4. The real-time processor according to claim 3, further comprising an execution time register referred to by said instruction processing unit to store the time when said time dependent instruction has been executed by said instruction processing unit.

5. The real-time processor according to claim 3, further comprising a flag register storing a comparison result of said time comparator at the time point when said time dependent instruction has been executed by said instruction processing unit, wherein said instruction processing unit executes an execution time dependent instruction whose execution status is altered according to a value of said flag register.

6. The real-time processor according to claim 5, wherein said execution time dependent instruction is a condition branch instruction whose branching is altered depending upon a value of said flag register.

7. The real-time processor according to claim 1, wherein said time dependent instruction is a memory reference instruction whose execution is temporarily delayed depending upon the comparison result of said time comparator.

8. The real-time processor according to claim 1, wherein said time dependent instruction is an input/output port reference instruction whose execution is temporarily delayed depending upon the comparison result of said time comparator.

9. The real-time processor according to claim 1, wherein said time dependent instruction is a qualify instruction specifying that the instruction to be executed next is an instruction whose execution is temporarily delayed depending upon the comparison result of said time comparator.

10. The real-time processor according to claim 1, further comprising a subtracter subtracting the time stored in said time register from the time in said clock register, wherein said instruction processing unit sets said subtracted result in said clock register and sets a predetermined time in said time register.

11. The real-time processor according to claim 1, further comprising a subtracter subtracting the time in said clock register from the time stored in said time register, wherein said instruction processing unit sets said subtracted result in said time register, and a predetermined time in said clock register.

12. The real-time processor according to claim 1, wherein said instruction processing unit comprises a general-purpose register and a functional circuit computing values stored in said clock register, said time register and said general-purpose register in an arbitrary combination, and storing the computed result in any of said clock register, said time register and said general-purpose register.

13. The real-time processor according to claim 1, further comprising a clock controller controlling frequency of a clock applied to said instruction processing unit.

14. The real-time processor according to claim 13, wherein said clock controller ceases output of said clock when a time dependent instruction that delays instruction execution depending upon the comparison result of said time comparator is executed by said instruction processing unit.

15. The real-time processor according to claim 1, wherein said instruction processing unit executes an instruction referring to a value input from an externally connected input/output device, said externally connected input/output device being a general-purpose register.

16. The real-time processor according to claim 15, wherein said instruction processing unit executes an instruction that provides a value to an externally connected input/output device by writing a value in said general-purpose register.

17. The real-time processor according to claim 1, wherein said processor is a single processor.

18. An instruction execution method of a processor, comprising the steps of:
updating a time at a predetermined interval;
storing an arbitrary time point independent of said updated time, as a time when execution of an instruction is to be completed;
comparing said updated time with said stored arbitrary time point, including detecting that the time matches the stored arbitrary time point and detecting that the time is greater than the stored arbitrary time point;
executing the instruction, whose execution status is altered according to a comparison result from the comparing of said updated time with said stored arbitrary time point;
executing a time-dependent instruction, for the associated executing instruction, that delays a completion of said executing instruction until said comparison result indicates that the time matches the stored arbitrary time point or indicates that the time is greater than the stored arbitrary time point; and
storing said comparison result of said time comparator in a flag register at a time point when said time dependent instruction has been executed by said execution step, wherein an execution status of an execution time dependent instruction is altered according to a value of said flag register.

19. The instruction execution method according to claim 18, further comprising the steps of:
subtracting a predetermined value from said updated time, and
subtracting the predetermined value from said stored arbitrary time.

20. A real-time processor comprising:
a clock register updating a time at a predetermined interval;
a time register storing an arbitrary time point independent of said updated time, as a time that execution of an instruction is to be completed;
a time comparator comparing the time of said clock register and the arbitrary time point stored in said time register, detecting that the time of said clock register matches the time stored in said time register, and detecting that the time of said clock register is greater than the time stored in the time register;
an instruction processing unit executing the instruction, whose execution status is altered according to a comparison result of said time comparator, wherein said instruction processing unit executes a time-dependent instruction depending upon said comparison result of said time comparator; and
a flag register storing said comparison result of said time comparator at a time point when said time dependent instruction has been executed by said instruction processing unit,
wherein said instruction processing unit executes an execution time dependent instruction, for the associated executing instruction, that delays completion of said executing instruction until said comparator detects that the time in said clock register matches or that the time in said clock register is greater than the time point stored in said time register.

* * * * *